(12) United States Patent
Iyoda

(10) Patent No.: US 7,613,557 B2
(45) Date of Patent: Nov. 3, 2009

(54) VEHICLE CONTROL SYSTEM

(75) Inventor: Ikuhide Iyoda, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 216 days.

(21) Appl. No.: 11/627,074

(22) Filed: Jan. 25, 2007

(65) Prior Publication Data
US 2007/0192002 A1 Aug. 16, 2007

(30) Foreign Application Priority Data
Feb. 13, 2006 (JP) ............................. 2006-035249

(51) Int. Cl.
*B60T 7/12* (2006.01)
(52) U.S. Cl. ............................ 701/48; 701/37; 701/70; 280/5.514
(58) Field of Classification Search .................. 701/36, 701/48, 37; 280/5.5, 5.504, 5.505, 5.506, 280/5.507, 5.508, 5.509, 5.513, 5.514, 124.103, 280/6.15, 6.157
See application file for complete search history.

(56) References Cited

U.S. PATENT DOCUMENTS

| | | | | | |
|---|---|---|---|---|---|
| 3,698,772 | A | * | 10/1972 | Nixon | ...................... 303/156 |
| 4,659,104 | A | * | 4/1987 | Tanaka et al. | ............ 280/6.158 |
| 5,063,512 | A | | 11/1991 | Kamimura et al. | |
| 5,069,302 | A | | 12/1991 | Kageyama | |
| 5,074,569 | A | * | 12/1991 | Kawabata | ................ 280/6.158 |
| 5,130,927 | A | * | 7/1992 | Kunishima et al. | ............ 701/39 |
| 6,382,741 | B1 | * | 5/2002 | McCann et al. | ............. 303/191 |
| 7,192,033 | B2 | * | 3/2007 | Bolt et al. | ................ 280/5.514 |
| 2004/0145100 | A1 | * | 7/2004 | Delorenzis | ............... 267/64.28 |
| 2004/0260442 | A1 | * | 12/2004 | Holbrook et al. | .............. 701/37 |

FOREIGN PATENT DOCUMENTS

| | | |
|---|---|---|
| DE | 196 48 174 A1 | 5/1998 |
| DE | 19648174 A1 * | 5/1998 |
| DE | 102 26 683 A1 | 12/2003 |
| EP | 0 231 025 A2 | 8/1987 |
| JP | 7-237530 | 9/1995 |

(Continued)

*Primary Examiner*—Thomas G Black
*Assistant Examiner*—Peter D Nolan
(74) *Attorney, Agent, or Firm*—Oblon, Spivak, McClelland, Maier & Neustadt, L.L.P.

(57) ABSTRACT

A vehicle control system for controlling a vehicle having a body, a pair of front wheels, and a pair of rear wheels, including a body-height adjusting device which adjusts four body heights each of which is defined as a relative-position relationship between corresponding one wheel of the pair of front wheels and the pair of rear wheels, and the body; and a brake-operation-force control device which controls respective operation forces of a pair of front-wheel brakes and a pair of rear-wheel brakes that restrain respective rotations of the pair of front wheels and the pair of rear wheels. The brake-operation-force control device includes an operation-force lowering portion which lowers, when the body-height adjusting device is adjusting at least one of the four body heights, the respective operation forces of at least one pair of brakes of the pair of front-wheel brakes and the pair of rear-wheel brakes, as compared with the respective operation forces when the body-height adjusting device is not adjusting any of the four body heights.

30 Claims, 16 Drawing Sheets

FOREIGN PATENT DOCUMENTS

| | | | |
|---|---|---|---|
| JP | 2502367 | | 3/1996 |
| JP | 08-198071 A | * | 8/1996 |
| JP | 2000-142340 | * | 5/2000 |
| JP | 2000-159092 | * | 6/2000 |
| WO | WO 91/17069 | | 11/1991 |

* cited by examiner

CHANGE OF WHEEL BASE    INCREASE

CHANGE OF WHEEL BASE    DECREASE

FRONT WHEELS (DOUBLE WISHBONE SUSPENSION)

REAR WHEELS (4-LINK RIGID SUSPENSION)

$\Delta H_F = \Delta H_R$
$\Delta L_R > \Delta L_F$

VEHICLE CONTROL SYSTEM

The present application is based on Japanese Patent Application No. 2006-035249 filed on Feb. 13, 2006, the contents of which are incorporated herein by reference.

BACKGROUND OF THE INVENTION

1. Field of the Invention

The present invention relates to the art of cooperatively controlling a body height and a brake force in a vehicle including a body-height adjusting device (i.e., so-called "leveling" device) and a brake-force control device.

2. Discussion of Related Art

Japanese Patent No. 2502367 discloses the art of limiting, when a braking device of a vehicle is operating, an amount of change of height of the vehicle's body that is adjusted or changed by a body-height adjusting device.

SUMMARY OF THE INVENTION

It is an object of the present invention to provide the art of controlling a vehicle including a body-height adjusting device and a brake force control device to adjust quickly a height of the vehicle's body even when the brake force control device may be operating.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the claimed inventions. Each of the following modes (1) through (29) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith but also the detailed description of the preferred embodiments of the invention, and that in additional claimable modes, one or more elements or one or more technical features may be added to, or deleted from, any of the following specific modes.

(1) A vehicle control system for controlling a vehicle having a body, a pair of front wheels, and a pair of rear wheels, comprising:

a body-height adjusting device which adjusts four body heights each of which is defined as a relative-position relationship between corresponding one wheel of the pair of front wheels and the pair of rear wheels, and the body; and a brake-operation-force control device which controls respective operation forces of a pair of front-wheel brakes and a pair of rear-wheel brakes that restrain respective rotations of the pair of front wheels and the pair of rear wheels, wherein the brake-operation-force control device comprises an operation-force lowering portion which lowers, when the body-height adjusting device is adjusting at least one of the four body heights, the respective operation forces of at least one pair of brakes of the pair of front-wheel brakes and the pair of rear-wheel brakes, as compared with said respective operation forces when the body-height adjusting device is not adjusting any of the four body heights.

In the present vehicle control system, when the body-height adjusting device is adjusting at least one body height, the operation-force lowering portion lowers the respective operation forces of at least one pair of wheel brakes out of the pair of front-wheel brakes and the pair of rear-wheel brakes, so as to permit a change of a relative-position relationship that is caused, by the adjusting of the at least one body height, between the vehicle's body and at least corresponding one pair of wheels out of the pair of front wheels and the pair of rear wheels, in a front-rear direction of the vehicle in which the pair of front wheels and the pair of rear wheels are distant from each other. Thus, when the at least one body height is adjusted, the at least one pair of wheels can be moved relative to the body in the front-rear direction, without producing large sounds or noise or with reduced noise. In addition, the body height can be adjusted without consuming useless energy and, even if one or more wheel brakes may be placed in its or their inoperative states after the adjusting of the body height, the body height can be prevented from being largely changed. Thus, even during a braking operation, the adjusting of the body height can be performed such that an actual value of the body height may be quickly changed to a target value of the body height.

In a suspension of the vehicle, a wheel is held by the vehicle's body via a pivotable suspension arm. When a body height corresponding to the wheel is adjusted, the suspension arm is pivoted and accordingly the wheel is also pivoted, so that a relative-position relationship between the wheel and the body with respect to an upward-downward direction (e.g., a vertical direction) is changed. In this case, if an axis of the pivotal motion of the wheel is offset from a center of the wheel in the front-rear direction, a relative-position relationship between the wheel and the body with respect to the front-rear direction is also changed by the pivotal motion of the suspension arm.

In a particular case where two suspensions corresponding to the pair of front wheels and the pair of rear wheels, respectively, have a same structure and a same size, if the two body heights corresponding to the two front wheels and the two body heights corresponding to the two rear wheels are changed simultaneously and identically, then a relative-position relationship between the front wheels and the body in the front-rear direction and a relative-position relationship between the rear wheels and the body in the same direction are changed identically, so that a wheel base of the vehicle is not changed. Therefore, in the state in which all the four wheels of the vehicle are subject to the respective brake-operation forces, even if the two body heights corresponding to the two front wheels and the two body heights corresponding to the two rear wheels may be changed simultaneously and identically, no force is produced between the fours wheels and the body in the front-rear direction. On the other hand, if either the two body heights corresponding to the two front wheels or the two body heights corresponding to the two rear wheels are changed in the state in which all the four wheels are subject to the respective brake-operation forces, the wheel base is changed and accordingly a force is produced, by the adjusting of the two body heights, between the fours wheels and the body in the front-rear direction (hereinafter, this force will be referred to as the "front-rear force", where appropriate).

However, usually, two suspensions of a vehicle that correspond to a pair of front wheels and a pair of rear wheels, respectively, have different structures and/or different sizes. In this case, not only in the case where only the two body heights corresponding to the two front wheels or the two rear wheels are changed, but also in the case where the four body heights corresponding to both the two front wheels and the two rear wheels are changed, the wheel base is changed. Therefore, if the body heights corresponding to the front wheels and/or the rear wheels are changed in the state in which all the four wheels are subject to the respective brake-operation forces, a front-rear force is produced, by the adjusting of the body heights, between the fours wheels and the body.

Here, it is noted that even in the case where only one body height corresponding to one wheel (hereinafter, referred to as the "body-height-adjusting target wheel", where appropriate) is adjusted, a change of a relative-position relationship between the one wheel and the body in the front-rear direction occurs. Therefore, even in the case where there is only one body-height-adjusting target wheel, if the corresponding body height is adjusted in the state in which all the wheels are subject to the respective brake-operation forces, a front-rear force is produced between the wheels and the body.

That is, if at least one body height is adjusted in the state in which all the wheels are subject to the respective brake-operation forces, usually, a front-rear force (i.e., a force to change the wheel base of the vehicle) is produced, by the adjusting of the at least one body height, between the wheels and the body. If the front-rear force is applied to the wheels, then a brake force as a reaction force is applied to the same. The brake force corresponds to a frictional force produced between respective tires of the wheels and a road surface on which the vehicle is present. More specifically described, in a range in which a brake torque corresponding to the brake-operation forces is smaller than a torque corresponding to a maximum static frictional force produced between the tires and the road surface, the brake force corresponds to the brake torque. In this range, if the front-rear force caused by the adjusting of body height(s) exceeds the brake force, then the wheels are permitted to rotate and accordingly the vehicle is moved. On the other hand, in a range in which the brake torque is greater than the torque corresponding to the maximum static frictional force, if the front-rear force caused by the adjusting of body height(s) exceeds the brake force, then the vehicle is moved while the wheels are not permitted to rotate, i.e., are slid on the road surface. In either case, large sounds or noise are or is produced when the wheels are rotated or slid.

In the case where the body-height adjusting device includes four fluid chambers that are provided between four wheel-holding devices that hold the four wheels, respectively, and the vehicle's body, more fluid needs to flow into, or out of, the fluid chamber(s) to change an actual body height(s) to a target body height(s), in the state in which all the four wheels are subject to the respective brake-operation forces, than in the state in which not all the wheels are subject to the respective brake-operation forces. Therefore, for example, if the wheel brakes corresponding to the front wheels and/or the rear wheels are placed in their inoperative states after the adjusting of body height(s), then the body height(s) is(are) more largely changed. In addition, more energy needs to be consumed in the adjusting of body height(s).

If the body height(s) is(are) adjusted in the state in which all the four wheels are subject to the respective brake-operation forces, the above-described events occur. Hereinafter, those events will be referred to as the "undesirable events that occur when the body height(s) is(are) adjusted in the state in which all the four wheels are subject to the respective brake-operation forces", or as just "the undesirable events". The undesirable events do not occur in the state in which either the front wheels or the rear wheels are not subject to the brake-operation forces, because the wheels free of the brake-operation forces are permitted to rotate and accordingly the wheel base is permitted to change.

The operation-force lowering portion may lower the respective operation forces of either the pair of front-wheel brakes or the pair of rear-wheel brakes, or may lower the respective operation forces of those two pairs of wheel brakes. In each case, it is preferred that the operation-force lowering portion lower the operation forces in such a manner that the vehicle is not moved. The occurrence of the above-described undesirable events may be restrained by lowering the operation force of just one of the four wheel brakes corresponding to the four wheels. In this case, however, the adjusting of body height(s) may cause a yaw moment to occur to the vehicle. In contrast, if the respective operation forces of the front-wheel brakes and/or the rear-wheel brakes are lowered, then the occurrence of the yaw moment can be effectively prevented.

In particular, if the respective operation forces of the front-wheel brakes and/or the rear-wheel brakes are lowered to zero, i.e., if the front-wheel brakes and/or the rear-wheel brakes are placed in their inoperative states, then the corresponding two, or four, wheels are fully permitted to rotate because of the adjusting of body height(s). If those operation forces are lowered to not zero but low forces, then those wheels are brought into such a state in which the wheels can be more easily rotated. As the operation forces lower as described above, the brake force also lowers. Therefore, even if the front-rear force may be small, the wheels can be moved while being rotated, and accordingly the above-described undesirable events can be restrained. The above-indicated phrase "lowers the respective operation forces" means decreasing the operation forces (e.g., quickly or slowly decreasing the operation forces), or decreasing the operation forces and then holding the decreased operation forces. The operation forces of the wheel brakes may be held or kept at zero, or at greater forces than zero. In the case where each of the wheel brakes includes a frictional member as a body-side member, and a rotary member that is rotated with the corresponding wheel, the operation force of the each wheel brake may be a pressing force to press the frictional member against the rotary member.

In the case where the operation-force lowering portion lowers the respective operation forces of either the front-wheel brakes or the rear-wheel brakes, the lowering portion may lower the respective operation forces of a pre-selected pair of wheel brakes out of the front-wheel brakes and the rear-wheel brakes, or may select, each time an operation-force lowering operation is carried out, one pair of wheel brakes from the front-wheel brakes and the rear-wheel brakes and lower the respective operation forces of the thus selected pair of wheel brakes. For example, the operation-force lowering portion may alternately select the front-wheel brakes or the rear-wheel brakes, or change the current selected pair of wheel brakes to the other pair of wheel brakes, each time a predetermined number of operation-force lowering operations have been carried out. In the case where the operation-force lowering portion lowers the respective operation forces of one pair of wheel brakes out of the front-wheel brakes and the rear-wheel brakes, the one pair of wheel brakes may be selected by an operation-force-lowering-target-wheel selecting portion. Although the operation-force-lowering-target-wheel selecting portion will be described in detail later, the selecting portion may be a portion of either the body-height adjusting device or a portion of the brake-operation-force control device, or may be independent of those devices.

The body-height adjusting device adjusts the body height as the relative-position relationship between each wheel and the vehicle's body, and may be one that changes the body height by utilizing a fluid such as air or a hydraulic liquid. In addition, the adjusting device may be one that can adjust the four body heights corresponding to the four wheels, independent of each other, or one that can commonly adjust the two body heights corresponding to each pair of wheels of the pair of front wheels or the pair of rear wheels.

The brake-operation-force control device can control the respective operation forces of the pair of front-wheel brakes and the respective operation forces of the pair of rear-wheel brakes, independent of each other, such that the controlled operation forces become different from operation forces corresponding to a driver's operating force applied to a brake operating member (e.g., a brake pedal) of the vehicle. The brake-operation-force control device may be one that can control respective operation forces of at least one pair of service brakes, or one that can control respective operation forces of at least one pair of parking brakes. Each of the four wheel brakes may be a frictional brake that includes a frictional member as a body-side member, and a rotary member that is rotated with the corresponding wheel, and that presses the frictional member against the rotary member so as to restrain the rotation of the wheel. The frictional brake may be a hydraulic brake that presses, with a hydraulic pressure, the frictional member against the rotary member; an electric brake that presses, with a pressing force of an electric motor, the frictional member against the rotary member; or an electric parking brake that pulls, with an electric motor, a cable and thereby presses the frictional member against the rotary member. In each case, the brake-operation forces are controlled by controlling an electric current supplied to a regulator that regulates the hydraulic pressure, or to the electric motor. The brake-operation-force control device may be one that can automatically operate the wheel brakes even though a driver of the vehicle may not be operating the brake operating member, or even through the vehicle may be a unmanned vehicle. However, each feature is not essential.

As is apparent from the above explanations, when adjusting of a body height is carried out during a braking operation, the vehicle control system disclosed by the above-identified Japanese Patent No. 2502367 1 limits an amount of changing of the body height, whereas the vehicle control system in accordance with the present invention lowers the operation forces of at least one pair of wheel brakes. That is, in the vehicle control system in accordance with the present invention, the adjusting of body height(s) is carried out with priority over the braking of wheels. Thus, when the adjusting of body height(s) is carried out during the braking operation, the respective operation forces of the front-wheel brakes and/or the rear-wheel brakes are lowered. Therefore, when the adjusting of body height(s) is carried out during the braking operation, the actual body height(s) can be quickly adjusted to the target body height(s) while the occurrence of the above-described undesirable events is effectively avoided.

(2) The vehicle control system according to the mode (1), wherein the operation-force lowering portion comprises a wheel-rotation permitting portion which lowers, in at least a portion of a time duration when the body-height adjusting device adjusts said at least one body height, the respective operation forces of said at least one pair of brakes, so as to permit respective rotations of at least corresponding one pair of wheels of the pair of front wheels and the pair of rear wheels, and thereby permit a change of a wheel base defined as a distance between the pair of front wheels and the pair of rear wheels.

In the vehicle control system in accordance with the mode (2), the wheel-rotation permitting portion lowers, in at least a portion of the time duration when the body-height adjusting device adjusts at least one body height, the respective operation forces of at least one pair of wheel brakes, so as to permit respective rotations of at least corresponding one pair of wheels and thereby permit the wheel base to be changed by the adjusting of the at least one body height.

The respective operation forces of the at least one pair of wheel brakes may be continuously lowered during the time duration when the body-height adjusting device adjusts the at least one body height, i.e., from a start time, to an end time, of the time duration, or may be lowered only during a period from a time when an operation-force-lowering starting condition is met, to a time when an operation-force-lowering ending condition is met. The operation-force-lowering starting condition may be a condition that the adjusting of body height(s) has been stated; a condition that a first reference time has passed since the adjusting of body height(s) was started; a condition that an amount of change of the body height(s) has reached a first reference amount; or a condition that an amount of change of the wheel base has reached a second reference amount, on the assumption that no operation forces of the wheel brakes are applied to the wheels. The operation-force-lowering ending condition may be a condition that a second reference time has passed since the adjusting of body height(s) was started; a condition that the respective operation forces of the wheel brakes have been continuously lowered for a reference time period; or a condition that a body-height-adjusting ending condition has been met.

Thus, the operation forces of the wheel brakes need not be continuously lowered during the time duration when the body-height adjusting operation is carried out. If the respective operation forces are lowered in at least a portion of the time duration, then the above-described undesirable events can be restrained.

In addition, when the lowering of the operation forces of the wheel brakes is ended, those operation forces may be returned to their initial values before the lowering is started; may be changed to respective values appropriate at the current time; may be changed to respective values not smaller than a reference value; or may be increased by an incremental value.

During the body-height adjusting operation, the operation forces of the wheel brakes may be lowered just one time, or alternatively, two or more times. As described later, the operation forces of the wheel brakes may be lowered and then increased (e.g., returned) repeatedly, i.e., a plurality of times.

(3) The vehicle control system according to the mode (1) or the mode (2), wherein the operation-force lowering portion comprises a body-height-adjusting-side operation-force lowering portion which lowers, when the body-height adjusting device is adjusting said at least one body height, the respective operation forces of said at least one pair of brakes that correspond to said at least one body height.

In the vehicle control system in accordance with the mode (3), at least one pair of wheels including at least one wheel corresponding to the at least one body height to be adjusted are selected by the operation-force-lowering-target-wheel selecting portion.

(4) The vehicle control system according to any of the modes (1) through (3), wherein the operation-force lowering portion comprises a larger-displacement-side operation-force lowering portion which lowers the respective operation forces of one pair of brakes of the pair of front-wheel brakes and the pair of rear-wheel brakes that correspond to a larger one of respective relative displacements between each pair of wheels of the pair of front wheels and the pair of rear wheels, and the body, that are so designed as to, when the body-height adjusting device changes the four body heights by a same amount, occur in a front-rear direction of the vehicle because of the changing of the four body heights.

A relative displacement that occurs between each pair of wheels (out of the pair of front wheels and the pair of rear wheels) and the vehicle's body in the front-rear direction of the vehicle because of the changing of the four body heights, depends on a structure and a size of a suspension corresponding to the each pair of wheels. Therefore, it is reasonable to select, as operation-force-lowering target wheels, one pair of wheels corresponding to a larger one of the respective relative displacements that occur, in the front-rear direction, between each pair of wheels of the pair of front wheels and the pair of rear wheels, and the vehicle's body.

For example, generally, a larger relative displacement occurs, in the front-rear direction, to a double Wishbone suspension or a strut suspension than to a trailing-arm suspension, a leading-arm suspension, or a rigid suspension. In addition, a larger relative displacement occurs to a full-trailing-arm suspension having a longer arm, than to a full-trailing-arm suspension that is of the same sort but has a shorter arm.

There are some cases where which relative displacement is the larger (or smaller), the front-rear-direction relative displacement between the front wheels and the body or the front-rear-direction relative displacement between the rear wheels and the body, depends on the current value(s) of the body height(s) when the adjusting thereof is carried out, and/or the amount(s) of change of the body height(s). In those cases, each time a body-height adjusting operation is carried out, the larger-displacement-side operation-force lowering portion may judge which relative displacement is the larger, and may select, as the operation-force-lowering target wheels, one pair of wheels corresponding to the larger one of the respective relative displacements.

(5) The vehicle control system according to any of the modes (1) through (4), wherein the pair of front wheels and the pair of rear wheels comprise a pair of drive wheels to which a drive force of a drive source of the vehicle is transmitted, and a pair of non-drive wheels to which said drive force is not transmitted, and wherein the operation-force lowering portion comprises a non-drive-wheel operation-force lowering portion which lowers, at least in a state in which said drive force is transmitted to the pair of drive wheels, the respective operation forces of one pair of brakes of the pair of front-wheel brakes and the pair of rear-wheel brakes that correspond to the pair of non-drive wheels.

In a state in which a direction of the drive force transmitted to the drive wheels is same as a direction of the front-rear force caused by the adjusting of body height(s), if the operation forces of the wheel brakes corresponding to the drive wheels are lowered, then the drive wheels become more easily movable. On the other hand, in a state in which those two directions are opposite to each other, the drive force resists the movement of the drive wheels and accordingly the drive wheels do not become more easily movable even if the operation forces of the wheel brakes applied to the drive wheels may be lowered. Thus, in the vehicle control system in accordance with the present mode (5), the non-drive wheels are selected as the operation-force-lowering target wheels and accordingly it is possible to avoid such an event that the drive wheels do not become more easily movable even if the brake-operation forces applied thereto may be lowered.

(6) The vehicle control system according to any of the modes (1) through (5), wherein the pair of front wheels and the pair of rear wheels comprise a or the pair of drive wheels to which a drive force of a drive source of the vehicle is transmitted, and a or the pair of non-drive wheels to which said drive force is not transmitted, and wherein the operation-force lowering portion comprises a first force-direction-dependent operation-force lowering portion which lowers, when a direction of the drive force transmitted to the pair of drive wheels is same as a direction of a force applied to the pair of drive wheels because of the adjusting of said at least one body height by the body-height adjusting device, the respective operation forces of one pair of brakes of the pair of front-wheel brakes and the pair of rear-wheel brakes that correspond to the pair of drive wheels.

(7) The vehicle control system according to any of the modes (1) through (6), wherein the pair of front wheels and the pair of rear wheels comprise a or the pair of drive wheels to which a drive force of a drive source of the vehicle is transmitted, and a or the pair of non-drive wheels to which said drive force is not transmitted, and wherein the operation-force lowering portion comprises a second force-direction-dependent operation-force lowering portion which lowers, when a direction of the drive force transmitted to the pair of drive wheels is opposite to a direction of a force applied to the pair of drive wheels because of the adjusting of said at least one body height by the body-height adjusting device, the respective operation forces of one pair of brakes of the pair of front-wheel brakes and the pair of rear-wheel brakes that correspond to the pair of non-drive wheels.

In the state in which the direction of the drive force transmitted to the drive wheels is same as the direction of the front-rear force caused by the adjusting of body height(s), it is preferred to select, as the operation-force-lowering target wheels, the drive wheels. If the brake-operation forces applied to the drive wheels are lowered, then the drive wheels become more easily movable. On the other hand, in the state in which the two directions are opposite to each other, the drive force resists the movement of the drive wheels and accordingly it is preferred to select, as the operation-force-lowering target wheels, the non-drive wheels.

(8) The vehicle control system according to the mode (6) or the mode (7), wherein the first or second force-direction-dependent operation-force lowering portion comprises a direction obtaining portion which obtains respective directions of respective forces applied to the pair of front wheels and the pair of rear wheels because of the adjusting of said at least one body height by the body-height adjusting device.

A direction of the front-rear force caused by the adjusting of body height(s) corresponds to a direction of change of the wheel base caused by the adjusting. Therefore, obtaining the direction of the front-rear force means obtaining the direction of change of the wheel base.

In the case where the body-height-adjusting target wheel or wheels belongs to, or are, one pair of wheels out of the pair of front wheels and the pair of rear wheels, a direction of change of the wheel base (i.e., whether the wheel base is increased or decreased) corresponds to a direction of displacement of the one pair of wheels relative to the vehicle's body in the front-rear direction, caused by the adjusting of body height(s). The direction of displacement of the one pair of wheels depends on a structure and a size of the suspension associated with the one pair of wheels; respective relative positions between those wheels and the vehicle's body in the upward-downward direction (i.e., respective body heights), respective rates of change of those relative positions, and/or amounts of change of the relative positions, when the adjusting of body height(s) is carried out; and so on.

In the case where the body-height-adjusting target wheels are both the pair of front wheels and the pair of rear wheels, a direction of change of the wheel base corresponds to not only a direction and an amount of displacement of the pair of front wheels relative to the vehicle's body in the front-rear direction, caused by the adjusting of body heights, but also a direction and an amount of displacement of the pair of rear wheels relative to the vehicle's body in the front-rear direction, caused by the adjusting of body heights. The direction of displacement of each pair of wheels of the two pairs of wheels depends on a structure and a size of the suspension associated with the each pair of wheels; respective relative positions between those wheels and the body in the upward-downward direction (i.e., respective body heights), respective rates of change of those relative positions, and/or amounts of change of the relative positions, when the adjusting of body heights is carried out; and so on.

A relationship between body height and front-rear-direction relative displacement (i.e., a relationship between (a) relative position between each pair of wheels and the body in the upward-downward direction and (b) relative position between the each pair of wheels and the body in the front-rear direction depends on the structure and the size of the suspension associated with the each pair of wheels. Therefore, if the respective relationships corresponding to the pair of front wheels and the pair of rear wheels are obtained in advance and are stored in a memory, then a direction and an amount of displacement of each pair of wheels relative to the vehicle's body in the front-rear direction, caused by the adjusting of body height(s), can be obtained based on respective relative positions (i.e., body heights) between those wheels and the body in the upward-downward direction, respective rates of change of those relative positions, and/or amounts of change of the relative positions, when the adjusting of body height(s) is started.

(9) The vehicle control system according to any of the modes (6) through (8), wherein the first or second force-direction-dependent operation-force lowering portion comprises a two-wheel drive-force transmission-state obtaining portion which detects whether the vehicle is in a two-wheel drive-force transmission state in which the drive force of the drive source is transmitted to one pair of wheels of the pair of front wheels and the pair of rear wheels and is not transmitted to an other pair of wheels of the pair of front wheels and the pair of rear wheels.

In the case where the vehicle is a part-time four-wheel-drive vehicle, the vehicle may be switchable, upon driver's operation of a drive-force transmission-state switching (or selecting) member, to a four-wheel drive-force transmission state in which the drive force of the drive source of the vehicle is transmitted to all the four wheels, and to a two-wheel drive-force transmission state in which the drive force of the drive source is transmitted to only the two wheels. Otherwise, the vehicle may be automatically switchable between the two transmission states, depending upon, e.g., a running condition of the vehicle. Therefore, the two-wheel drive-force transmission-state obtaining portion can detect whether the vehicle is in the two-wheel drive-force transmission state, based on, e.g., the current operation position of the drive-force transmission-state switching member and/or the current running condition of the vehicle.

(10) The vehicle control system according to any of the modes (6) through (9), wherein the first or second force-direction-dependent operation-force lowering portion comprises a drive-wheel drive-force transmission-state obtaining portion which detects whether the drive force of the drive source is transmitted to the pair of drive wheels.

A state in which the drive source is in its operative state does not readily mean that the drive force is being transmitted to the drive wheels. For example, if a shift lever of the vehicle is in a non-transmission range or position such as a neutral position or a parking position, then the drive force is not being transmitted to the drive wheels. On the other hand, if the drive source is in its inoperative state, then no drive force is transmitted to the drive wheels even if the shift lever is in a transmission position or range such as a drive range or a reverse range. Thus, when the drive source is in its operative state and the shift lever is in one of the transmission ranges, the drive force is transmitted to the drive wheels.

(11) The vehicle control system according to any of the modes (1) through (10), wherein the pair of front wheels and the pair of rear wheels comprise two pairs of drive wheels to each of which a drive force of a drive source of the vehicle is transmitted, and wherein the operation-force lowering portion comprises a four-drive-wheel force-direction-dependent operation-force lowering portion which lowers the respective operation forces of one pair of brakes of the pair of front-wheel brakes and the pair of rear-wheel brakes that correspond to one pair of drive wheels of the two pairs of drive wheels, when a direction of the drive force transmitted to said one pair of drive wheels is same as a direction of a force applied to said one pair of drive wheels because of the adjusting of said at least one body height by the body-height adjusting device.

A direction of the front-rear force caused by the adjusting of body height(s) is either a direction to increase the wheel base, or a direction to decrease the same.

In a state in which the drive force of the drive source is transmitted to both the two front wheels and the two rear wheels, a direction of the drive force transmitted to the front wheels is same as a direction of the drive force transmitted to the rear wheels, although the same direction may change between a direction to move the vehicle forward and a direction to move the vehicle backward. Therefore, when the drive force is transmitted to the four wheels in the direction to move the vehicle forward, a front-rear force to increase the wheel base has the same direction as the direction of the drive force transmitted to the front wheels; and a front-rear force to decrease the wheel base has the same direction as the direction of the drive force transmitted to the rear wheels. On the other hand, when the drive force is transmitted to the four wheels in the direction to move the vehicle backward, they are vice versa, i.e., the front-rear force to increase the wheel base has the same direction as the direction of the drive force transmitted to the rear wheels; and the front-rear force to decrease the wheel base has the same direction as the direction of the drive force transmitted to the front wheels.

(12) The vehicle control system according to any of the modes (1) through (11), wherein the operation-force lowering portion comprises a body-height-change-amount-dependent operation-force lowering portion which lowers, when an amount of change of said at least one body height caused by the body-height adjusting device has reached a first reference amount, the respective operation forces of said at least one pair of brakes of the pair of front-wheel brakes and the pair of rear-wheel brakes.

(13) The vehicle control system according to any of the modes (1) through (12), wherein the operation-force lowering portion comprises a wheel-base-change-amount-dependent operation-force lowering portion which lowers, when the body-height adjusting device is adjusting said at least one body height and when an amount of change of a wheel base of the vehicle caused by the adjusting of said at least one body height has reached a second reference amount on an assumption that at least one of the front and rear wheels that corresponds said at least one body height is permitted to rotate, the respective operation forces of said at least one pair of brakes.

In many cases, in a state in which no operation forces of the two pairs of wheel brakes are applied to the two pairs of wheels, i.e., the two pairs of wheels are permitted to rotate, a relative displacement between each pair of wheels and the vehicle's body in the front-rear direction, caused by the adjusting of body height(s), increases as the amount(s) of change of the body height(s) increase(s). That is, in many cases, in a state in which the front and rear wheels are subject to the respective operation forces of the front-wheel and rear-wheel brakes, if the amount(s) of change of the body height(s) increase(s), then respective amounts of elastic deformation of, e.g., the suspensions increase, and accordingly the front-rear force increases. However, so long as the amount(s) of change of the body height(s) is(are) small, the front-rear force is also small. Thus, the operation forces of the wheel brakes need not be lowered. Therefore, in the vehicle control system in accordance with the mode (12), when the amount of change of the body height(s) has reached the first reference amount, the respective operation forces of the wheel brakes are lowered. Thus, no useless brake-operation-force lowering control is performed.

However, strictly, it cannot be said, in all cases, that since the amount of change of the body height(s) is great, the amount of relative displacement in the front-rear direction is also great. For example, as described above, when two body heights are changed by a same amount in two vehicles, respectively, two front-rear-direction relative displacements corresponding to the two vehicles may be changed by different amounts, if the two vehicles employ different suspensions having different structures and/or sizes. In addition, there is known such a suspension in which a relative displacement between a pair of wheels and a vehicle's body in a front-rear direction is changed in a same direction not only when a corresponding body height(s) is(are) changed from a normal position(s) to a higher position (s) but also when the body height(s) is(are) changed from the normal position(s) to a lower position(s). In this suspension, when the body height(s) is(are) adjusted from the lower position(s) to the higher position(s) via the normal position(s), a front-rear-direction relative displacement may be small even if an amount(s) of change of the body height(s) may be great. Hence, the vehicle control system in accordance with the mode (13) preferably obtains the amount of change of the wheel base that is caused by the adjusting of the body height(s) on the assumption that the wheel(s) corresponding the body height(s) is(are) not subject to the operation force(s) of the corresponding wheel brake(s), i.e., is(are) permitted to rotate. In the case where the body-height-adjusting target wheel or wheels belongs to, or are, one pair of wheels of the pair of front wheels and the pair of rear wheels, an amount of change of the wheel base (i.e., whether the wheel base is increased or decreased) corresponds to an amount of displacement of the one pair of wheels relative to the vehicle's body in the front-rear direction, caused by the adjusting of body height(s); and in the case where the body-height-adjusting target wheels are both the pair of front wheels and the pair of rear wheels, an amount of change of the wheel base corresponds to not only a direction and an amount of displacement of the pair of front wheels relative to the vehicle's body in the front-rear direction, caused by the adjusting of body heights, but also a direction and an amount of displacement of the pair of rear wheels relative to the vehicle's body in the front-rear direction, caused by the adjusting of body heights.

The first reference amount recited in the mode (12) may be determined at an amount of change of the body height(s) when the amount of change of the wheel base has reached the second reference amount on the assumption that the wheel(s) corresponding the body height(s) is(are) not subject to the operation force(s) of the corresponding wheel brake(s), as recited in the mode (13).

(14) The vehicle control system according to any of the modes (1) through (13), wherein the operation-force lowering portion comprises a memory which stores, for each pair of wheels of the pair of front wheels and the pair of rear wheels, a relationship between (a) said at least one body height that is adjusted by the body-height adjusting device and (b) relative displacement that is caused between the body and said each pair of wheels when said at least one body height is adjusted by the body-height adjusting device.

(15) The vehicle control system according to any of the modes (1) through (14), wherein the operation-force lowering portion comprises a reference-value-dependent operation-force lowering portion which lowers the respective operation forces of said at least one pair of brakes to a value not greater than a reference value.

The reference value may be a value in the vicinity of zero. For example, the at least one pair of wheel brakes may be placed in their inoperative states. In the latter case, the operation-force lowering portion can be said as a brake-operation stopping portion. If the at least one pair of wheel brakes are placed in their inoperative states, then the corresponding pair or pairs of wheels become more easily movable as compared with the case where the operation forces of the wheel brakes are lowered to respective values greater than zero. The brake-operation stopping portion may be one that continuously keeps the at least one pair of wheel brakes to their inoperative states during the body-height adjusting operation, or one that alternately switches the at least one pair of wheel brakes between their inoperative states and their operative states.

Alternatively, the operation-force lowering portion may be one that includes means for lowering the respective operation forces of the at least one pair of brakes, each by a predetermined amount.

(16) The vehicle control system according to any of the modes (1) through (15), wherein the operation-force lowering portion comprises an intermittently lowering portion which intermittently increases the respective operation forces of said at least one pair of brakes to a value not smaller than a first reference value and lowers said respective operation forces to a value not greater than a second reference value smaller than the first reference value.

The first reference value may be a value that can restrain the rotations of at least one pair of wheels of the pair of front wheels and the pair of rear wheels, for example, a value that is determined according to the current operation state of the brake operating member operated by the driver, or a value that is needed to keep the vehicle to its stopped state (e.g., a value determined according to an amount of inclination of the road surface).

The second reference value that is smaller than the first reference value may be a value that permits the at least one pair of wheels to rotate owing to the front-rear force caused by the adjusting of body height(s). For example, the second reference value may be a value in the vicinity of zero. So long as the respective operation forces of the at least one pair of brakes are not higher than the second reference value, the at least one pair of brakes may be either in their inoperative states or in their operative states.

Since the state in which the rotations of the at least one pair of wheels are restrained and the state in which the rotations of those wheels are permitted are repeatedly switched to each other, the movement of the vehicle can be more effectively prevented as compared with the case where the respective operation forces of the at least one pair of brakes are continuously kept to values not higher than the second reference value.

(17) The vehicle control system according to any of the modes (1) through (16), wherein the operation-force lowering portion comprises a periodically lowering portion which selectively switches, at a predetermined time period, said at least one pair of brakes to a first operation state thereof in which the respective operation forces thereof are not smaller than a third reference value, and to a second operation state thereof in which the respective operation forces thereof are not greater than a fourth reference value smaller than the third reference value.

In the vehicle control system in accordance with the present mode, the first operation state and the second operation state are periodically switched to each other. For example, the at least one pair of wheel brakes can be periodically switched between their inoperative states and their operative states.

(18) The vehicle control system according to any of the modes (1) through (17), wherein the operation-force lowering portion comprises a first operation-force-dependent operation-force lowering portion which controls, when an amount of change of said at least one body height caused by the body-height adjusting device has reached a reference amount in a state in which the respective operation forces of the pair of front-wheel brakes and the pair of rear-wheel brakes are not smaller than a fifth reference value, the respective operation forces of said at least one pair of brakes to a value not greater than a sixth reference value smaller than the fifth reference value.

In the vehicle control system in accordance with the present mode (18), the respective operation forces of the at least one pair of wheel brakes are lowered when the front-rear force caused by the adjusting of body height(s) is increased to a certain extent. If the changing of the wheel base is permitted by the lowering of the brake-operation forces, then the front-rear force is decreased. However, if the body height(s) is(are) adjusted in the state in which the respective operation forces of the front-wheel and rear-wheel brakes are not smaller than the fifth reference value, then the amount(s) of elastic deformation of, e.g., the suspension(s) increase(s) and accordingly the front-rear force increases. Therefore, it is preferable to lower, after the brake-operation forces have been lowered for a predetermined time duration for the last time so as to permit the changing of the wheel base, and then the brake-operation forces have been increased up to the fifth reference value, the brake-operation forces when the amount of change of the body height(s) has reached the reference amount.

In the vehicle control system in accordance with the present mode (18), the respective operation forces of the at least one pair of wheel brakes may be lowered a plurality of times during one body-height adjusting operation.

(19) The vehicle control system according to any of the modes (1) through (18), wherein the operation-force lowering portion comprises an operation-force lowering and increasing portion which lowers the respective operation forces of one pair of brakes of the pair of front-wheel brakes and the pair of rear-wheel brakes and increases the respective operation forces of an other pair of brakes of the pair of front-wheel brakes and the pair of rear-wheel brakes.

(20) The vehicle control system according to the mode (19), wherein the operation-force lowering and increasing portion controls the respective operation forces of said other pair of brakes to a value assuring that a speed of movement of the vehicle is not higher than a reference speed.

Since the respective operation forces of one pair of wheel brakes are lowered and the respective operation forces of the other pair of wheel brakes are increased, the occurrence of the undesirable events can be restrained while the movement of the vehicle is prevented.

The respective operation forces of the one pair of wheel brakes may be lowered to not greater than the above-described second, fourth, or sixth reference value. However, this is not essentially needed. The operation forces may be lowered to zero (i.e., the one pair of wheel brakes may be placed in their inoperative states), or may be lowered to values greater than zero.

The respective operation forces of the other pair of wheel brakes may be increased each by a predetermined amount, or may be so increased as to keep the speed of movement of the vehicle to not higher than the reference speed. The reference speed may be a speed in the vicinity of zero. The amount by which the respective operation forces of the other pair of wheel brakes are increased may be determined according to a moving force to move the vehicle. The moving force depends on, e.g., an angle of inclination of the road surface, the current drive-force transmission state of the vehicle, etc. Since the brake-operation forces are so increased that the speed of movement of the vehicle does not exceed the reference speed, the brake-operation forces can be prevented from being excessively increased.

(21) The vehicle control system according to any of the modes (1) through (20), wherein the operation-force lowering portion comprises a brake control portion which lowers the respective operation forces of said at least one pair of brakes when the pair of front-wheel brakes and the pair of rear-wheel brakes are in respective operative states thereof and a body-height adjusting request is obtained.

The wheel brakes may be operated by the driver's operation of the brake operating member to operate the brakes, or may be automatically operated without the driver's operation of the brake operating member. For example, the brakes may be automatically operated when a relative-position relationship between the prevent vehicle and another vehicle running ahead satisfies a predetermined condition (e.g., a tendency of the prevent vehicle to approach the running-ahead vehicle is stronger than a reference level), or when the present vehicle is operated in an unmanned manner.

When the wheel brakes are in their operative states and the body-height adjusting request is obtained, the operation forces of the brakes may be lowered unconditionally, or may be lowered only when a condition that there is a need to lower the brake-operation forces is met (e.g., when the condition recited in the mode (12) or the mode (13) is met). If the wheel brakes are in their operative states and the body-height adjusting request is obtained, then it can be said that a state in which it is desirable to lower the brake-operation forces may possibly occur and, in fact, the condition to lower the brake-operation forces, as recited in the mode (12) or the mode (13), will be met with a high probability.

(22) The vehicle control system according to any of the modes (1) through (21), wherein the operation-force lowering portion comprises a stopped-state-dependent operation-force lowering portion which lowers the respective operation forces of said at least one pair of brakes when a speed of movement of the vehicle is not higher than a reference speed at which the vehicle can be regarded as being in a stopped state, and the body-height adjusting device is adjusting said at least one body height.

(23) The vehicle control system according to any of the modes (1) through (22), wherein the operation-force lowering portion comprises a target-stroke-dependent operation-force lowering portion which lowers the respective operation forces of said at least one pair of brakes when an absolute value of a difference of (a) a value of said at least one body height when the body-height adjusting device starts adjusting said at least one body height, and (b) a target value of said at least one body height, is not smaller than a reference value.

If the amount of change of the at least one body height when the body height is adjusted, i.e., a target stroke is small, no excessively great front-rear force is produced. Therefore, there is no strong need to lower the brake-operation forces.

(24) The vehicle control system according to any of the modes (1) through (23), wherein the operation-force lowering portion comprises a second operation-force-dependent operation-force lowering portion which lowers the respective operation forces of said at least one pair of brakes when an average value of the respective operation forces of said at least one pair of brakes is not smaller than a reference value, and the body-height adjusting device is adjusting said at least one body height.

Generally, it can be said that if the brake-operation forces are small, then the frictional force (i.e., the brake force) produced between the tires of the wheels and the road surface is also small. And, if the brake force is small, the wheels are permitted to move or rotate even if the front-rear force may be small. Thus, there is no strong need to lower the brake-operation forces. The average value of the respective operation forces of the at least one pair of brakes may be an average value of the respective operation forces of the two pairs of brakes, or an average value of the respective operation forces of one pair of brakes out of the pair of front-wheel brakes and the pair of rear-wheel brakes. As far as the mode (24) is concerned, the word "average" is defined as encompassing— average—, —mean—, and —median—.

(25) The vehicle control system according to any of the modes (1) through (24), wherein the pair of front-wheel brakes and the pair of rear-wheel brakes comprise two pairs of service brakes which correspond to the pair of front wheels and the pair of rear wheels, respectively, and which are operated by operating a service-brake operating member of the vehicle, and wherein the operation-force lowering portion comprises a service-brake control portion which lowers, when the body-height adjusting device is adjusting said at least one body height in a state in which the service-brake operating member is operated, respective operation forces of one pair of service brakes of the two pairs of service brakes that are applied to corresponding one pair of wheels of the pair of front wheels and the pair of rear wheels.

In the vehicle control system in accordance with the present mode (25), the respective operation forces of the one pair of service brakes may be controlled to values different from values corresponding to the driver's operating force applied to the service-brake operating member.

In addition, when the respective operation forces of the one pair of service brakes are lowered, the respective operation forces of the other pair of service brakes are not lowered. The service brakes may be hydraulic brakes or electric brakes.

(26) The vehicle control system according to the mode (25), wherein the service-brake control portion comprises a parking-brake-free-side operation-force lowering portion which lowers the respective operation forces of said one pair of service brakes that correspond to said one pair of wheels that are free of a parking brake.

(27). The vehicle control system according to the mode (25) or the mode (26), wherein the service-brake control portion comprises a parking-brake-inoperative-state-dependent operation-force lowering portion which lowers, when a pair of parking brakes of the vehicle are in respective operative states thereof for one pair of wheels of the pair of front wheels and the pair of rear wheels, the respective operation forces of said one pair of service brakes that correspond to an other pair of wheels of the pair of front wheels and the pair of rear wheels.

The parking brakes may be mechanical ones whose operation forces cannot be automatically lowered. In this case, the respective operation forces of one pair of service brakes corresponding to one pair of wheels free of the parking brakes are lowered. In many cases, parking brakes are associated with either front wheels or rear wheels, i.e., are not associated with both the front wheels and the rear wheels.

Irrespective of whether the parking brakes are in their operative states or in their inoperative states, the operation-force lowering portion may lower the respective operation forces of one pair of service brakes corresponding to one pair of wheels free of the parking brakes. In this case, operation-force lowering portion need not detect whether the parking brakes are in their operative states or not.

(28) The vehicle control system according to any of the modes (1) through (27), wherein the pair of front-wheel brakes and the pair of rear-wheel brakes comprise two pairs of service brakes which correspond to the pair of front wheels and the pair of rear wheels, respectively, and the vehicle has at least one pair of parking brakes for at least one pair of service brakes of the two pairs of service brakes, wherein the brake-operation-force control device controls each of respective operation forces of the two pairs of service brakes and respective operation forces of said at least one pair of parking brakes, and wherein the operation-force lowering portion lowers at least one of (a) the respective operation forces of at least one pair of service brakes of the two pairs of service brakes and (b) the respective operation forces of said at least one pair of parking brakes.

In the vehicle control system in accordance with the present mode, the respective operation forces of the two pairs of service brakes and the respective operation forces of the at least one pair of parking brakes are each controllable. Therefore, irrespective of whether each pair of wheels are provided with a pair of parking brakes, or whether the pair of parking brakes are in their operative states or in their inoperative states, the respective operation forces applied to the each pair of wheels can be lowered.

In the state in which the pair of front wheels and the pair of rear wheels are subject to the respective operation forces of the two pairs of service brakes, the respective operation forces of at least one pair of service brakes corresponding to at least one pair of wheels of the pair of front wheels and the pair of rear wheels are lowered. In the state in which the pair of front wheels and the pair of rear wheels are subject to the respective operation forces of two pairs of parking brakes, the respective operation forces of at least one pair of parking brakes corresponding to at least one pair of wheels are lowered. In the state in which the pair of front wheels and the pair of rear wheels are subject to the respective operation forces of the two pairs of service brakes and the respective operation forces of two pairs of parking brakes, the respective operation forces of (a) at least one pair of service brakes and/or (b) at least one pair of parking brakes that correspond to at least one pair of wheels are lowered. In each case, the respective operation forces of at least one pair of brakes corresponding to at least one pair of wheels can be lowered. This is true with the following mode (29).

(29) The vehicle control system according to any of the modes (1) through (28), wherein the vehicle has two pairs of first brakes whose operation forces are controllable by the brake-operation-force control device and which are provided for the pair of front wheels and the pair of rear wheels, respectively; and a pair of second brakes whose operation forces are not controllable by the brake-operation-force control device and which are provided for one pair of wheels of the pair of front wheels and the pair of rear wheels, and wherein the operation-force lowering portion comprises an uncontrollable-brake-free-side operation-force lowering portion which lowers, when the two pairs of first brakes are in respective operative states thereof and the pair of second brakes are in respective operative states thereof, the respective operation forces of one pair of first brakes of the two pairs of first brakes that correspond to an other pair of wheels of the pair of front wheels and the pair of rear wheels.

The two pairs of first brakes and the at least one pair of second brakes may be two pairs of service brakes and at least one pair of parking brakes, respectively. However, this is not essentially required. In each of the above-described modes (25) through (28), the two pairs of service brakes may be the two pairs of first brakes recited in the mode (29), and the at least one pair of parking brakes may be the at least one pair of second brakes recited in the same mode.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described in detail, by reference to the drawings, a vehicle control system to which the present invention is applied.

Figure 1:
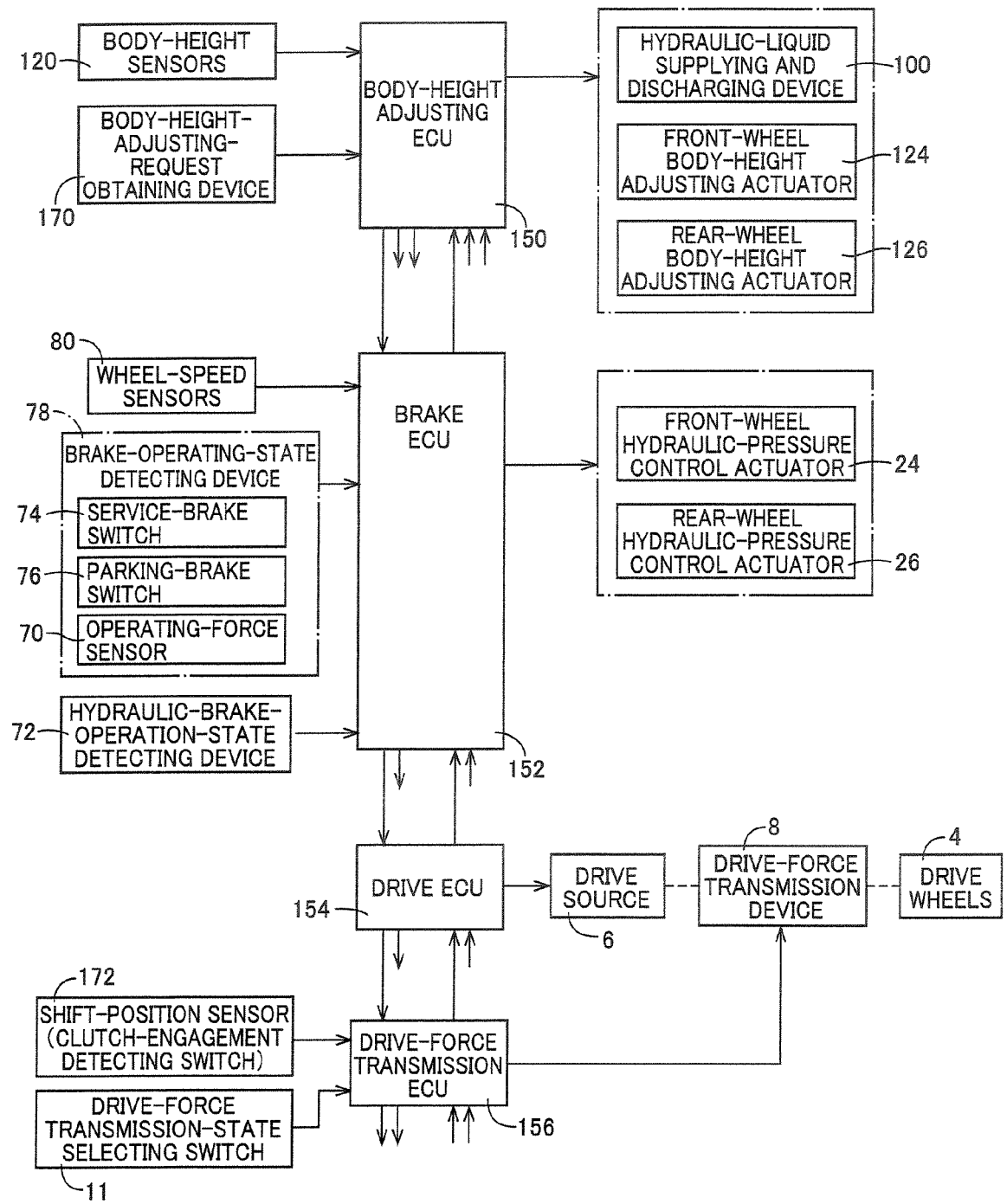
FIG. 1 is a view of a vehicle control system as a first embodiment of the present invention.
Figure 2:
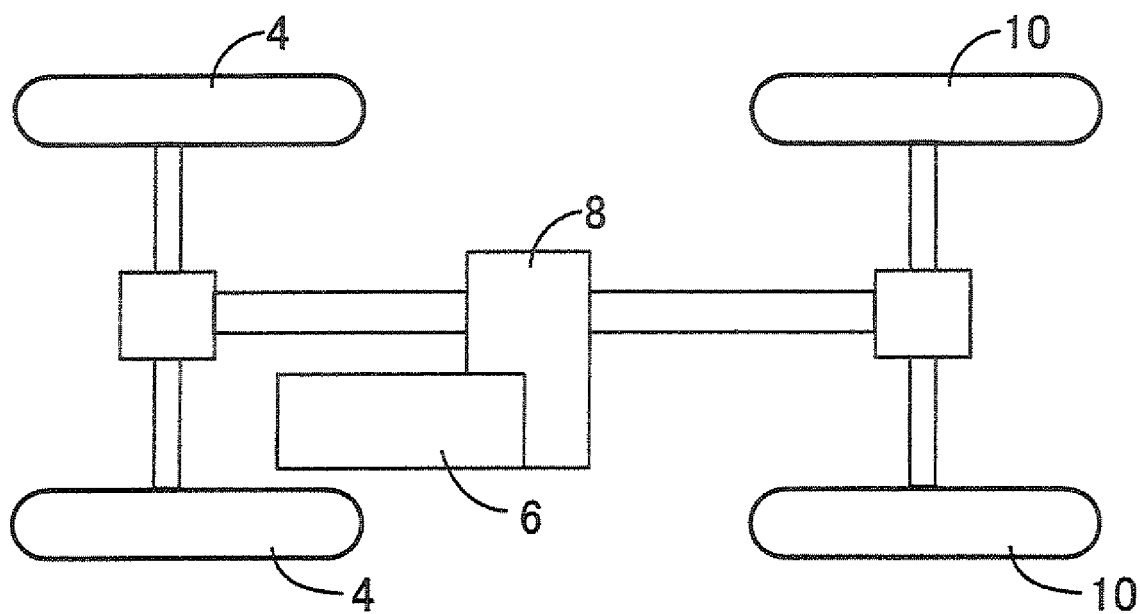
FIG. 2 is a view of a vehicle employing the vehicle control system.

As shown in FIG. 2, the present vehicle control system is employed by a part-time four-wheel-drive vehicle. The vehicle includes front left and right wheels 4, rear left and right wheels 10, a drive source 6, a drive-force transmission device 8, and a drive-force transmission-state selecting switch 11 (FIG. 1) that is manually operable by a driver (i.e., a driving person), that is, is switchable between a front-wheel driving state (i.e., a front-wheel drive-force transmission state) in which a drive force of the drive source 6 can be transmitted to the two front wheels 4 via the drive-force transmission device 8, and a four-wheel driving state (i.e., a four-wheel drive-force transmission state) in which the drive force of the drive source 6 can be transmitted to all the four wheels 4, 10 via the drive-force transmission device 8.

Figure 3:
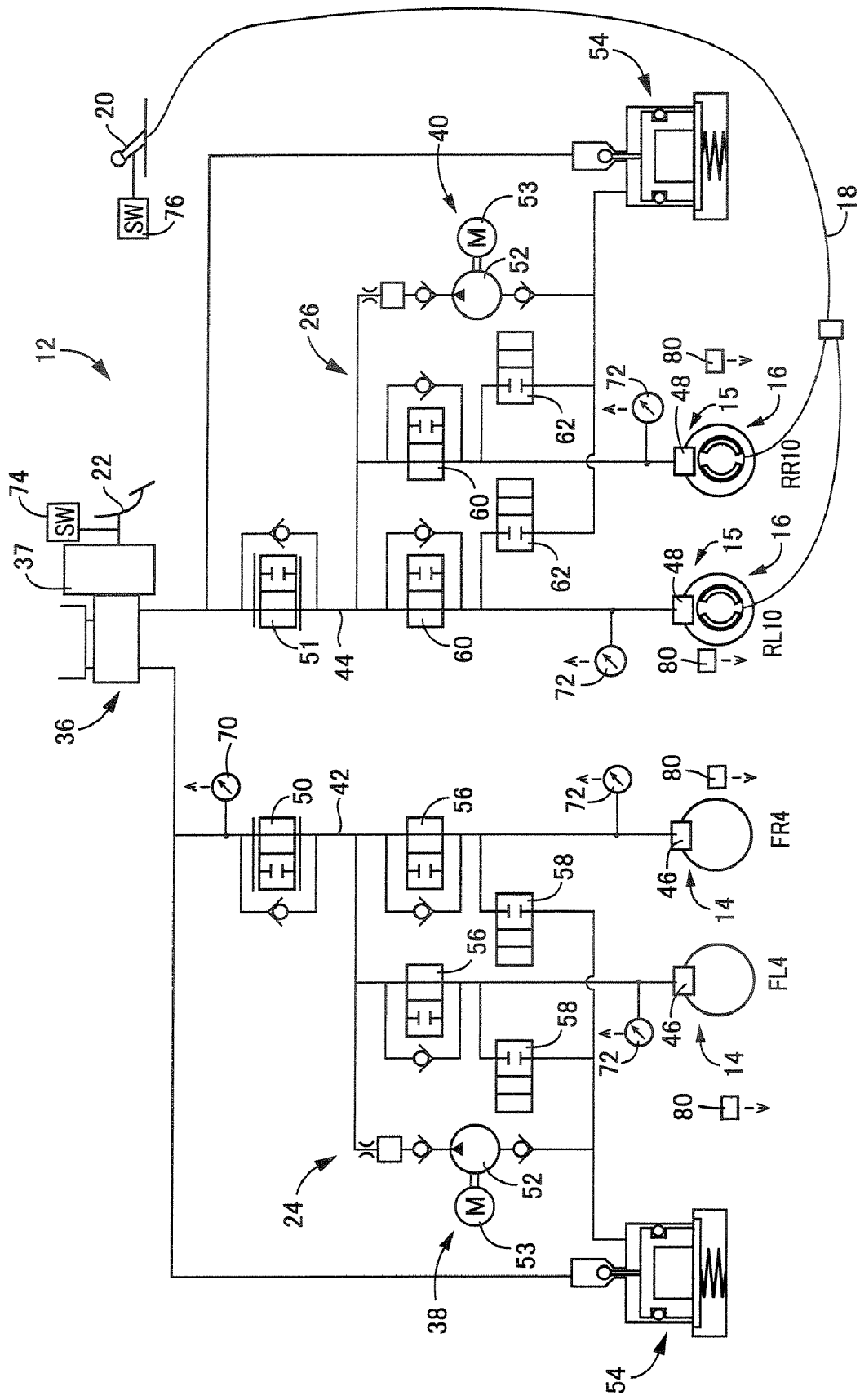
FIG. 3 is view of a braking system as a portion of the vehicle control system.

FIG. 3 shows a braking system 12 that restrains or stops rotation of each of the four wheels 4, 10, i.e., front left wheel FL4, front right wheel FR4, rear left wheel RL10, and rear right wheel RR10. The braking system 12 includes four hydraulic brakes 14, 15 as service brakes that are associated with the four wheels 4, 10, respectively; and a pair of parking brakes 16 that are associated with the two rear wheels 10. In the present embodiment, each of the parking brakes 16 is a mechanical one that includes a cable 18 and a parking-brake operating member 20 manually operable by the driver, and that is placed in an operative state thereof when the operating member 20 or the cable 18 is pulled, and is placed in an inoperative state thereof when the cable 18 is released. In the state in which the cable 18 is pulled, the parking brakes 16 are kept to their operative states even if the driver stops applying his or her operating force to the operating member 20. The two hydraulic brakes 14 corresponding to the two front wheels 4 have respective brake cylinders 46; and the two hydraulic brakes 15 corresponding to the two rear wheels 10 have respective brake cylinders 48. The braking system 12 additionally includes a front-wheel hydraulic-pressure control actuator 24 and a rear-wheel hydraulic-pressure control actuator 26. Basically, the hydraulic brakes 14, 15 are operated when a service-brake operating member 22 is manually operated by the driver. However, respective hydraulic pressures in the four brake cylinders 46, 48 can be automatically increased and decreased under respective controls of the two hydraulic-pressure control actuators 24, 26, irrespective of whether the service-brake operating member 22 is operated by the driver or not.

Figure 4:
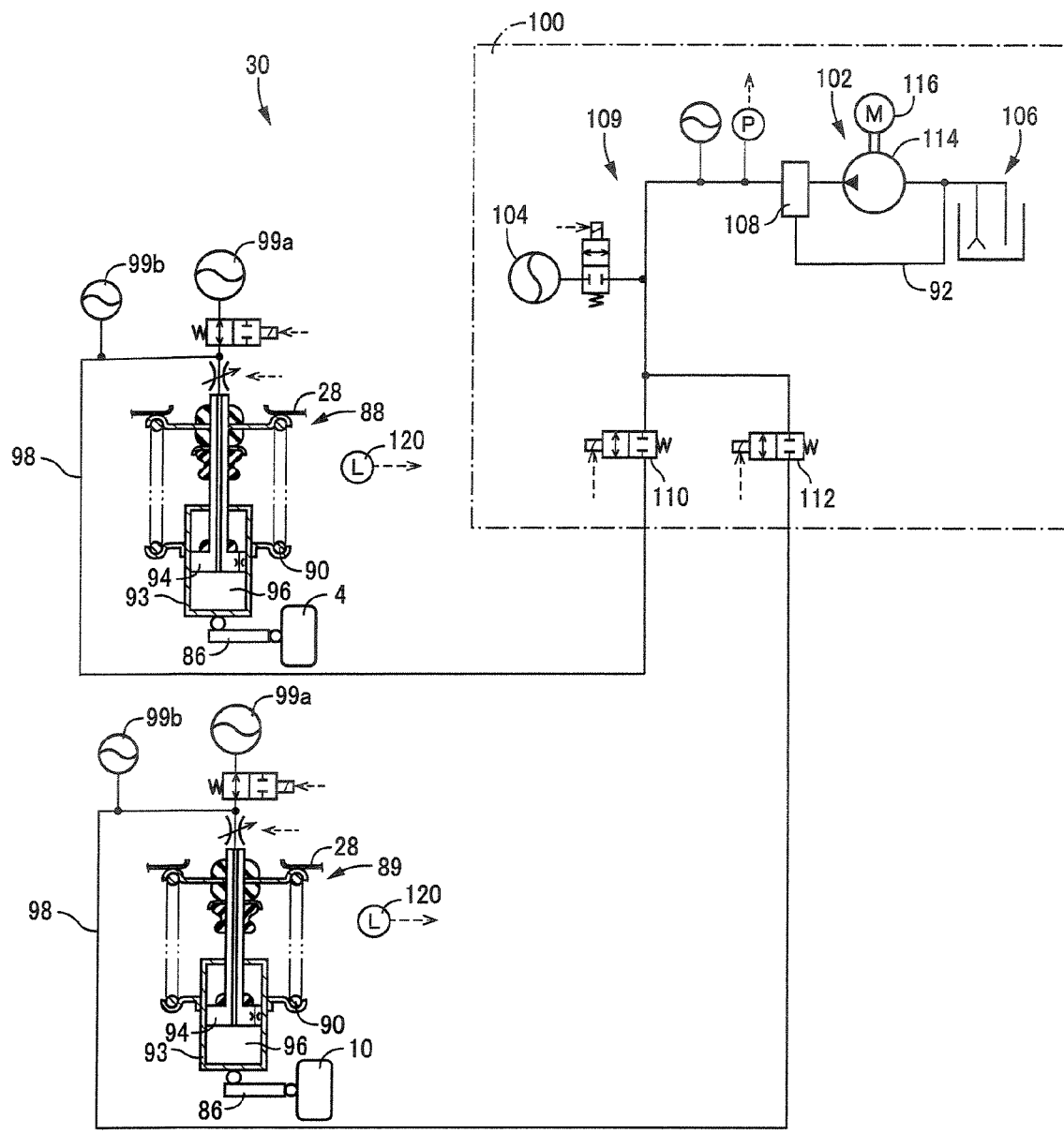
FIG. 4 is a view of a body-height adjusting device as another portion of the vehicle control system.

FIG. 4 shows a body-height adjusting system 30 that adjusts a body height, i.e., a relative-position relationship between each one of the four wheels 4, 10 and a body 28 of the vehicle in an upward-downward direction (e.g., a vertical direction).

As shown in FIG. 3, the braking system 12 additionally includes a master cylinder 36; a booster 37; and two pump devices 38, 40 each as a power-assisted hydraulic-pressure source. The master cylinder 36 is connected to the respective brake cylinders 46 of the two front-wheel hydraulic brakes 14 via a first master passage 42, and is connected to the respective brake cylinders 48 of the two rear-wheel hydraulic brakes 15 via a second master passage 44. First and second hydraulic-pressure control valves 50, 51 are provided in the first and second master passages 42, 44, respectively.

Each of the two pump devices 38, 40 includes a pump 52 and a pump motor 53. When an electric current (i.e., power) is supplied to the pump motor 53, the front-side pump 52 is operated to pump up a hydraulic liquid from a corresponding reservoir 54 and outputs a pressurized hydraulic liquid. An liquid-output side of the front-side pump 52 is connected to a first portion of the first master passage 42 that is located between the hydraulic-pressure control valve 50 and the brake cylinders 46. Two pressure-hold valves 56 each as a normally-open solenoid-operated open/close valve are provided between the above-indicated first portion and the two brake cylinders 46, respectively. Two pressure-decrease valves 58 each as a normally-closed solenoid-operated open/close valve are provided between the front-side reservoir 54 and the two brake cylinders 46, respectively.

Similarly, a liquid-output side of the rear-side pump 52 is connected to a second portion of the second master passage 44 that is located between the hydraulic-pressure control valve 51 and the brake cylinders 48. Two pressure-hold valves 60 each as a normally-open solenoid-operated open/close valve are provided between the above-indicated second portion and the two brake cylinders 48, respectively. Two pressure-decrease valves 62 each as a normally-closed solenoid-operated open/close valve are provided between the rear-side reservoir 54 and the two brake cylinders 48, respectively.

Each of the hydraulic-pressure control valves 50, 51 is a solenoid-operated hydraulic-pressure control valve that includes a seating valve and a solenoid and that can control a hydraulic-pressure difference across the each valve 50, 51, to a value corresponding to an electric current supplied thereto. In a state in which no electric current is supplied to the solenoid of the each valve 50, 51, the sealing valve thereof is kept to an open state thereof, so that the corresponding brake cylinders 46, 48 is communicated with the master cylinder 36. Meanwhile, when the electric current is supplied to the solenoid of the each valve 50, 51, an electromagnetic force is produced to close the sealing valve thereof, so that a hydraulic pressure on the side of the corresponding brake cylinders 46, 48 becomes higher than a hydraulic pressure on the side of the master cylinder 36 by the magnitude of the electric current supplied. In this state, the corresponding brake cylinders 46, 48 are substantially shut off from the master cylinder 36.

A hydraulic pressure in the master cylinder 36 is detected by a master-cylinder pressure sensor 70; and respective hydraulic pressures in the four brake cylinders 46, 48 are detected by four brake-cylinder pressure sensors 72. Whether the service-brake operating member 22 is in an operative state thereof or an inoperative state thereof is detected by a service-brake switch 74; and whether the parking-brake operating member 20 is in its operative state or its inoperative state is detected by a parking-brake switch 76. Since the hydraulic pressure in the master cylinder 36 corresponds to an operating force applied by the driver to the service-brake operating member 22, the operating force, i.e., brake-operating force of the driver can be detected based on the hydraulic pressure of the master cylinder 36. In this respect, the master-cylinder pressure sensor 70 can be said as a brake-operating-force sensor. Thus, the master-cylinder pressure sensor 70, the service-brake switch 74, the parking-brake switch 76, etc. cooperate with each other to constitute a brake-operating-state detecting device 78 (FIG. 1). Meanwhile, since each of the brake-cylinder pressure sensors 72 can be used to detect whether the corresponding hydraulic brake 14, 15 is in an operative state thereof or an inoperative state thereof, the each brake-cylinder pressure sensor 72 can be said as a hydraulic-brake-operation-state detecting device. Respective rotation speeds of the four wheels 4, 10 are detected by four wheel-speed sensors 80, respectively.

In the braking system 12, when the service-brake operating member 22 is operated by the driver, the operating force applied to the operating member 22 is boosted or magnified by the booster 37, and a hydraulic pressure corresponding to the boosted operating force is produced in the master cylinder 36. This hydraulic pressure is transmitted to each of the brake cylinders 46, 48, so that the corresponding hydraulic brake 14, 15 is operated.

If an arbitrary one of the two pump devices 38, 40 is operated and the electric current supplied to a corresponding one of the two hydraulic-pressure control valves 50, 51 is controlled, the respective hydraulic pressures in the corresponding two brake cylinders 46 or 48 can be increased, as described above, to be higher than the hydraulic pressure in the master cylinder 36, by a pressure corresponding to the electric current supplied to the one valve 50, 51. For example, the electric current may be controlled such that after a limit of boosting of the booster 37 is reached, the respective hydraulic pressures in the corresponding two brake cylinders 46, 48 are increased up to the same values as the values to which those hydraulic pressures would be increased if the brake-operating force of the driver could be boosted by the booster 37 at the same rate as the rate before the limit of boosting is reached. Thus, the respective hydraulic pressures in the corresponding two brake cylinders 46, 48 can be increased to be higher than the hydraulic pressure in the master cylinder 36.

If each of the pressure-decrease valves 58, 62 is opened in the state in which a corresponding one of the pressure-hold valves 56, 60 is closed, the hydraulic pressure in the corresponding brake cylinder 46, 48 can be decreased by causing the hydraulic liquid to flow into the corresponding reservoir 54, even if the service-brake operating member 22 may be in the operative state, i.e., even if some hydraulic pressure may be present in the master cylinder 36.

Thus, in the present embodiment, the front-side pump device 38, the first hydraulic-pressure control valve 50, the two pressure-hold valves 56, the two pressure-decrease valves 58, etc. cooperate with each other to constitute the front-wheel hydraulic-pressure control actuator 24; and the rear-side pump device 40, the second hydraulic-pressure control valve 51, the two pressure-hold valves 60, the two pressure-decrease valves 62, etc. cooperate with each other to constitute the rear-wheel hydraulic-pressure control actuator 26. The front-wheel control actuator 24 and the rear-wheel control actuator 26 are controlled independent of each other, and accordingly the respective hydraulic pressures in the front-wheel brake cylinders 46 and the respective hydraulic pressures in the rear-wheel brake cylinders 48 can be controlled independent of each other.

In the braking system 12, even if the service-brake operating member 22 may not be operated by the driver, the hydraulic brakes 14 can be operated automatically. More specifically described, even if the operating member 22 may not be operated by the driver, i.e., even if the hydraulic pressure in the master cylinder 36 is substantially equal to an atmospheric pressure, a hydraulic pressure can be supplied to each of the brake cylinders 46, 48 if the corresponding pump device 38, 40 is operated and the corresponding hydraulic-pressure control valve 50, 51 is supplied with the electric current. For example, when a relative-position relationship between the prevent vehicle and another vehicle running ahead has a stronger tendency to approach each other than a reference tendency, e.g., when the two vehicles approach each other at a higher speed than a reference speed, the hydraulic brakes 14 may be operated automatically. Alternatively, when the prevent vehicle is run in an unmanned manner, the hydraulic brakes 14 may be automatically operated, as needed.

The service brakes may be provided by electric brakes that are associated with the wheels 4, 10, respectively. Each of the electric brakes includes a brake rotor fixed to the corresponding wheel 4, 10, a frictional member, and an electric motor that presses the frictional member against the brake rotor. In this case, the pressing force applied to the frictional member can be controlled by controlling an electric current supplied to the electric motor.

Moreover, the braking system 12 may be modified in various manners, e.g., such that the front-wheel brake cylinders 46 and the rear-wheel brake cylinders 48 can be controlled in a common manner.

As shown in FIG. 4, the body-height adjusting system 30 includes, for each of the two front wheels 4, a suspension cylinder 88 and a suspension spring 90 that are provided between the body 28 and a suspension arm 86 as a wheel-holding device, and additionally includes, for each of the two rear wheels 10, a suspension cylinder 89 and a suspension spring 90 that are provided between the body 28 and a suspension arm 86 as a wheel-holding device. Though the two suspension cylinders 88 are associated with the two front wheels 4, respectively, and the two suspension cylinders 89 are associated with the two rear wheels 10, respectively, only one suspension cylinder 88 and only one suspension cylinder 89 are shown in FIG. 4. The four suspension cylinders 88, 89 have an identical construction, and includes a housing 93, and a piston 94 that fits in the housing 93 such that the piston 94 is slidable in the housing 93. In the present embodiment, the housing 93 is connected to the suspension arm 86, and a piston rod of the piston 94 is connected to the body 28, such that the housing 93 is not movable relative to the suspension arm 86, and the piston rod of the piston 94 is not movable relative to the body 28, each in the vertical direction. The piston 94 has a communication passage with a flow restrictor (e.g., an orifice). Thus, each suspension cylinder 88, 89 produces a damping force corresponding to a speed at which the piston 94 is slid or moved relative to the housing 93. Thus, in the present embodiment, each suspension cylinder 88, 89 also functions as a shock absorber.

The housing 93 of each suspension cylinder 88, 89 has a piston-side chamber 96 which is filled with a hydraulic liquid and to which a liquid passage 98 is connected. In the liquid passage 98, there are provided two accumulators 99a, 99b. The four liquid passages 98 are also connected to a hydraulic-liquid supplying and discharging device 100. When each of the four wheels 4, 10 and the body 28 are moved relative to each other in the vertical direction, the hydraulic liquid is moved between the piston-side chamber 96 and the accumulators 99a, 99b. The hydraulic pressure in the piston-side chamber 96 is defined by respective hydraulic pressures in the accumulators 99a, 99b, i.e., respective elastic forces produced by the accumulators 99a, 99b, and the position of the body 28 relative to the each wheel 4, 10 in the vertical direction is defined by the hydraulic pressure in the piston-side chamber 96.

The hydraulic-liquid supplying and discharging device 100 includes a hydraulic-pressure source 109, and two first leveling valves 110 and two second leveling valves 112 (however, only one first leveling valve 110 and only one second leveling valve 112 are shown in FIG. 4). The hydraulic-pressure source 109 includes a pump device 102, a pressure-storage accumulator 104, a reservoir 106, an outflow control valve 108, etc. The pump device 102 includes a pump 114 and a pump motor 116. The pump 114 pumps up the hydraulic liquid from the reservoir 106, and outputs the pressurized hydraulic liquid. When the pump 114 is in an inoperative state thereof, the outflow control valve 108 is in an outflow position thereof in which the control valve 108 prevents the hydraulic liquid from flowing back from the suspension cylinders 88, 89 to a liquid-output side of the pump 114 and permits the hydraulic liquid to outflow from the suspension cylinders 88, 89 to the reservoir 106 via a by-pass passage 92; and when the pump 114 is in an operative state thereof, the outflow control valve 108 is in a supply position thereof in which the control valve 108 shuts off the communication between the suspension cylinders 88, 89 and the reservoir 106 and permits the suspension cylinders 88, 89 to communicate with the liquid-output side of the pump 114. Each of the four leveling valves 110, 112 is a normally-closed solenoid-operated open/close valve, and is provided between the hydraulic-pressure source 109 and a corresponding one of the four suspension cylinders 88, 89. When each leveling valve 110, 112 is in an open state thereof, the corresponding suspension cylinder 88, 89 is communicated with the hydraulic-pressure source 109; and when the each leveling valve 110, 112 is in a closed state thereof, the corresponding suspension cylinder 88, 89 is shut off from the hydraulic-pressure source 109.

If the pump device 102 is in its inoperative state and an arbitrary one of the four leveling valves 110, 112 is opened, the hydraulic liquid outflows from a corresponding one of the four suspension cylinders 88, 89 into the reservoir 106, so that the position of the body 28 relative to a corresponding one of the four wheels 4, 10 in the vertical direction is lowered. If the pump device 102 is in its operative state and an arbitrary one of the four leveling valves 110, 112 is opened, the hydraulic liquid flows from the pump device 102 into a corresponding one of the four suspension cylinders 88, 89, so that the position of the body 28 relative to a corresponding one of the four wheels 4, 10 in the vertical direction is raised. When a body-height adjusting operation is started, the four leveling valves 110, 112 are opened; and when the body-height adjusting operation is ended, the four leveling valves 110, 112 are closed. When a body-height adjusting operation is carried out to increase an arbitrary one of the respective positions of the body 28 relative to the four wheels 4, 10 in the vertical direction, i.e., an arbitrary one of the four body heights, the pump device 102 is operated. To this end, the hydraulic liquid stored by the pressure-storage accumulator 104 is also utilized. If one or both of the two front-side leveling valves 110 and one or both of the two rear-side leveling valves 112 are controlled independent of each other, one or both of the two front-side body heights and one or both of the two rear-side body heights can be controlled independent of each other. Thus, in the present embodiment, the two front-side body heights, the two rear-side body heights, or the four body heights may be simultaneously adjusted.

Four body-height sensors 120 are associated with the four wheels 4, 10, respectively, and each of the four body-height sensors 120 detects a corresponding one of the four body heights, i.e., a height position of the body 28 relative to a corresponding one of the four wheels 4, 10 in the vertical direction. The two front-side leveling valves 110, the hydraulic-pressure source 109, etc. cooperate with each other to constitute a front-wheel body-height adjusting actuator 124; and the two rear-side leveling valves 112, the hydraulic-pressure source 109, etc. cooperate with each other to constitute a rear-wheel body-height adjusting actuator 126.

In the present embodiment, the body-height adjusting operation is carried out using the hydraulic liquid as a sort of operating fluid. However, air may be used as the operating fluid. In addition, in the present embodiment, the two front-side leveling valves 110 are associated with the two front wheels 4, respectively, and the two rear-side leveling valves 112 are associated with the two rear wheels 10, respectively. However, a single front-side leveling valve 110 may be commonly associated with the two front wheels 4, and a single rear-side leveling valve 112 may be associated with the two rear wheels 10.

Figure 14A:
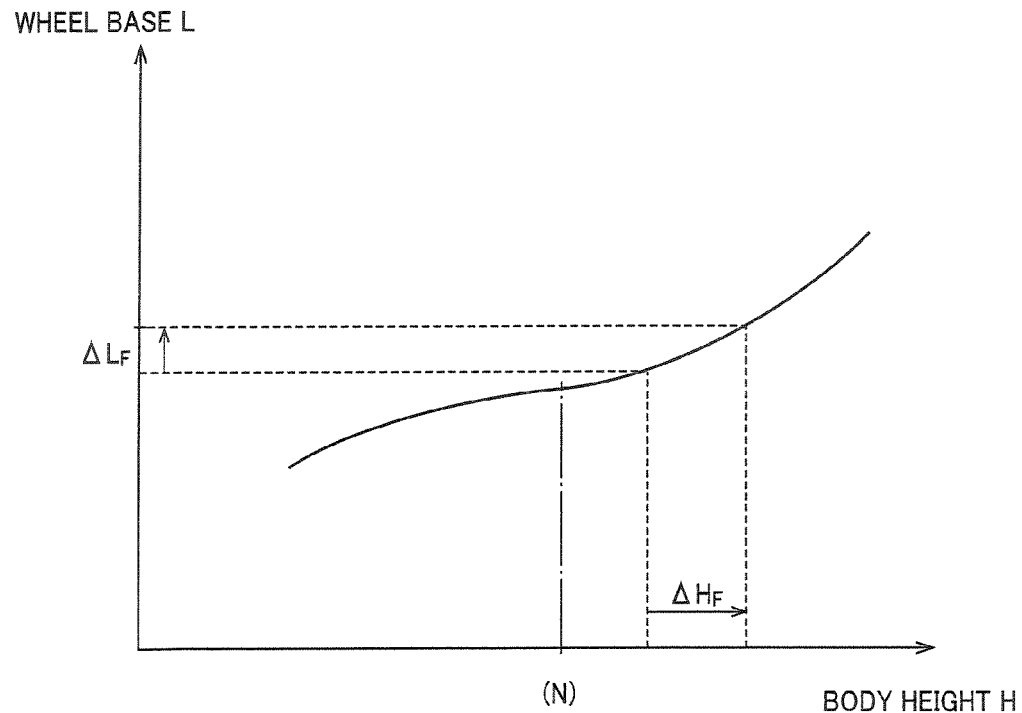
FIG. 14A is a table representing a relationship between body height H and wheel base L that corresponds to a front-wheel-side suspension provided for front wheels of the vehicle employing the vehicle control system.
Figure 14B:
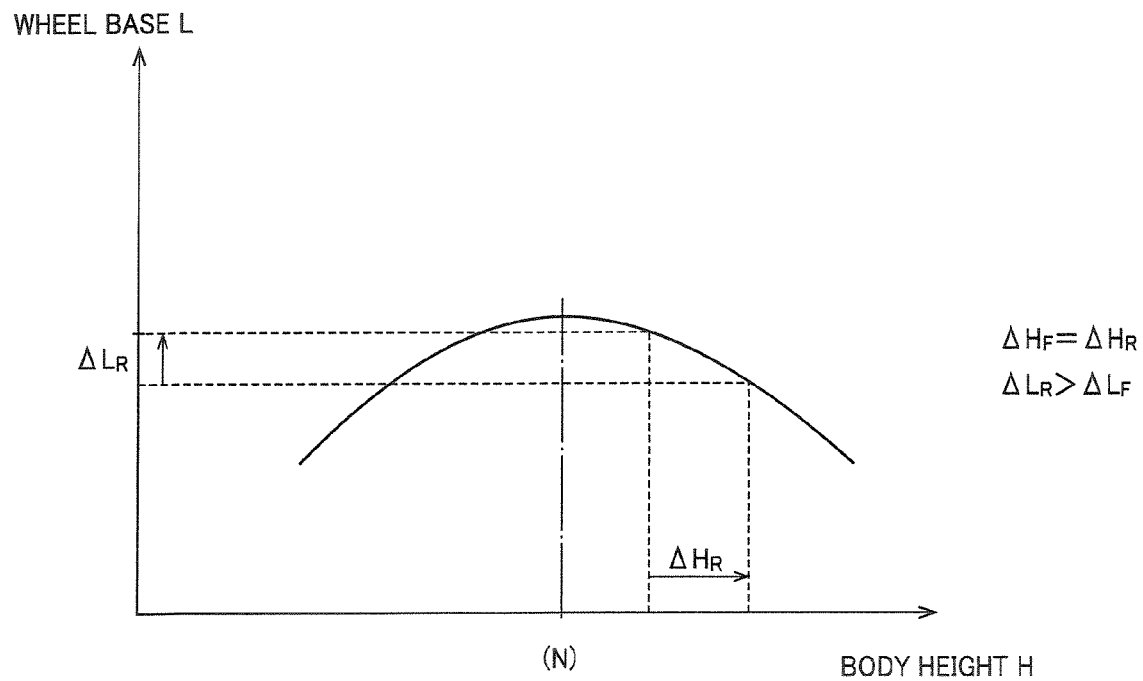
FIG. 14B is a table representing a relationship between body height H and wheel base L that corresponds to a rear-wheel-side suspension provided for rear wheels of the vehicle employing the vehicle control system.

In the present embodiment, the two front wheels 4 are associated with a double Wishbone suspension; and the two rear wheels 10 are associated with a 4-link rigid suspension. Therefore, when the body-height adjusting operation is carried out and a body height as a height position of the body 28 relative to an arbitrary one of the four wheels 4, 10 in the vertical direction is changed, then a position of the body 28 relative to the arbitrary wheel 4, 10 in a front-rear direction of the vehicle is also changed. FIG. 14A shows a relationship between change of body height, H, and change of wheel base, L, that is a position of each front wheel 4 relative to the body 28 in the front-rear direction; and FIG. 14B shows a relationship between change of body height H and change of wheel base L that is a position of each rear wheel 10 relative to the body 28 in the front-rear direction. From FIGS. 14A and 14B, it is apparent that the double Wishbone suspension and the 4-link rigid suspension exhibit different relationships between change of body height H and change of wheel base L. Regarding the double Wishbone suspension corresponding to the front wheels 4, if the body height H is raised from a normal position, N, then each front wheel 4 is moved frontward relative to the body 28 and accordingly the wheel base L is increased; and if the body height H is lowered from the normal position N, then each front wheel 4 is moved rearward relative to the body 28 and accordingly the wheel base L is decreased. Regarding the 4-link rigid suspension corresponding to the rear wheels 10, irrespective of whether the body height H may be raised, or lowered, from the normal position N, each rear wheel 10 is moved frontward relative to the body 28 and accordingly the wheel base L is decreased. In addition, if front-side body height H and rear-side body height H are changed by a same amount (i.e., $\Delta H_F = \Delta H_R$), then an amount of change of wheel base L corresponding to each rear wheel 10, i.e., the 4-link rigid suspension, i.e., is greater than an amount of change of wheel base L corresponding to each front wheel 4, i.e., the double Wishbone suspension (i.e., $\Delta L_F < \Delta L_R$). In the present embodiment, an amount of change of position of each wheel 4, 10 relative to the body 28 with respect to the front-rear direction is discriminated from a direction (i.e., a frontward or rearward direction) of that change. That is, an amount of change of position of each wheel 4, 10 relative to the body 28 is a scalar amount that does not contain any directional components. FIG. 14A shows the change of wheel base L when the body height H corresponding to each front wheel 4 is adjusted; and FIG. 14B shows the change of wheel base L when the body height corresponding to each rear wheel 10 is adjusted. Therefore, when the respective body heights corresponding to the front and rear wheels 4, 10 are adjusted, an overall change of wheel base L of the vehicle is obtained based on the respective changes of wheel bases L shown in FIGS. 14A and 14B.

As shown in FIG. 1, the present vehicle includes a body-height adjusting ECU (electronic control unit) 150, a brake ECU 152, a drive ECU 154, and a drive-force transmission ECU 156. Each of the body-height adjusting ECU 150, the brake ECU 152, the drive ECU 154, and the drive-force transmission ECU 156 is essentially constituted by a computer including an implementing portion, a data-storage portion (i.e., a memory), and an input/output portion. The body-height adjusting ECU 150 is connected to the body-height sensors 120 and a body-height-adjusting-request obtaining device 170. In addition, the body-height adjusting ECU 150 is connected via respective drive circuits (not shown) to the hydraulic-liquid supplying and discharging device 100, the front-wheel body-height adjusting actuator 124, and the rear-wheel body-height adjusting actuator 126. The body-height-adjusting-request obtaining device 170 includes, e.g., a body-height-adjusting-mode selecting switch, a body-height-adjusting commanding switch, a running-condition detecting device, an ignition switch, and a shift-position sensor 172, and judges whether a body-height-adjusting request is present or not, based on respective outputs of those switches and sensors. For example, in a state in which the vehicle is stopped and a manual body-height-adjusting mode is selected, if the body-height-adjusting commanding switch is operated by a person such as the driver, the obtaining device 170 judges that a body-height-adjusting request is present. In this case, based on a specific manner in which the body-height-adjusting commanding switch is operated, the obtaining device 170 judges that a request to increase at least one of the respective body heights with respect to the four wheels 4, 10 or a request to decrease at least one of those body heights is present and, based on this judgment, the body-height adjusting ECU 150 operates for increasing or decreasing at least one of the respective body heights with respect to the four wheels 4, 10. Alternatively, in a state in which the vehicle is stopped, if a position of a shift lever is changed from a parking position to a drive position or range (D) indicating a considerable likelihood that the vehicle will start running, the obtaining device 170 judges that a request to increase the respective body heights with respect to the four wheels 4, 10 is present and, based on this judgment, the body-height adjusting ECU 150 operates for increasing those body heights. In many cases where the obtaining device 170 judges that a request to increase the respective body heights with respect to the front and rear wheels 4, 10 is present, a same target body height is set for the respective body heights with respect to the front and rear wheels 4, 10. However, when the respective body heights with respect to the front and rear wheels 4, 10 are actually adjusted, the respective body heights with respect to the front wheels 4 and the respective body heights with respect to the rear wheels 10 may be adjusted either in an appropriate order, or simultaneously with each other. Moreover, in a state in which the vehicle is stopped, if an amount of inclination of the vehicle's body 28 with respect to the front-rear direction is greater than a reference angle, e.g., if an absolute value of a difference of the front-side body height(s) and the rear-side body height(s) is greater than a reference value, the obtaining device 170 judges that a request to adjust the body heights with respect to the front or rear wheels 4, 10 is present and, based on this judgment, the body-height adjusting ECU 150 operates for adjusting the body heights so as to decrease the inclination of the body 28. In this case, a target body height is set for the body heights with respect to either the front or rear wheels 4, 10. The state in which the vehicle is stopped may be caused by either the operation of the hydraulic brakes 14, 15 or the operation of the parking brakes 16.

The brake ECU 152 is connected to the wheel-speed sensors 80, the brake-operating-state detecting device 78, and the hydraulic-brake-operation-state detecting device 72. In addition, the brake ECU 152 is connected via respective drive circuits (not shown) to the front-wheel hydraulic-pressure control actuator 24 and the rear-wheel hydraulic-pressure control actuator 26.

The drive ECU 154 controls the drive source 6.

The drive-force transmission ECU 156 is connected to the shift-position sensor 172 and the drive-force-transmission-state selecting switch 11, and is connected via a drive circuit (not shown) to the drive-force transmission device 8. The drive-force transmission ECU 156 controls the drive-force transmission device 8 such that the transmission device 8 is selectively placed in the front-wheel drive-force transmission state in which the drive force of the drive source 6 is transmitted to the two front wheels 4, and in the four-wheel drive-force transmission state in which the drive force of the drive source 6 is transmitted to all the four wheels 4, 10.

In the present embodiment, according to the current position of the drive-force-transmission-state selecting switch 11 (i.e., the driver's intention), the front-wheel drive-force transmission state or the four-wheel drive-force transmission state is arbitrarily selected. However, the drive-force transmission ECU 156 may be modified to automatically control, based on, e.g., the current running condition of the vehicle, the drive-force transmission device 8 to take selectively the front-wheel drive-force transmission state or the four-wheel drive-force transmission state.

Regarding a manual-transmission vehicle, the shift-position sensor 172 may be replaced with a clutch-engagement detecting switch. When a clutch is in an engaged stated thereof, it can be judged that the drive force of the drive source 6 is transmitted to the drive wheels; and when the clutch is in a disengaged stated thereof, it can be judged that the drive force is not transmitted to the drive wheels.

It is not essentially required that the body-height-adjusting-request obtaining device 170 include the shift-position sensor 172. For example, the obtaining device 170 may be modified to obtain, based on information supplied from the drive-force transmission ECU 156, information representing the current position of the shift lever.

In each case, it is not essentially required that the various sensors and switches be connected to the ECUs 150, 152, 154, 156 in the specific manner shown in FIG. 1. For example, the shift-position sensor 172 may be connected to the body-height-adjusting ECU 150. Thus, the control system of the prevent vehicle may be constructed in various manners.

The respective computers of the ECUs 150, 152, 154, 156 communicate information or data with each other, i.e., transmit and receive information representing the results detected by the sensors and switches, information representing the respective current operation states of the actuators, information representing the current running condition of the vehicle, information representing commands to start or end the respective operations of the actuators, etc.

Figure 11:
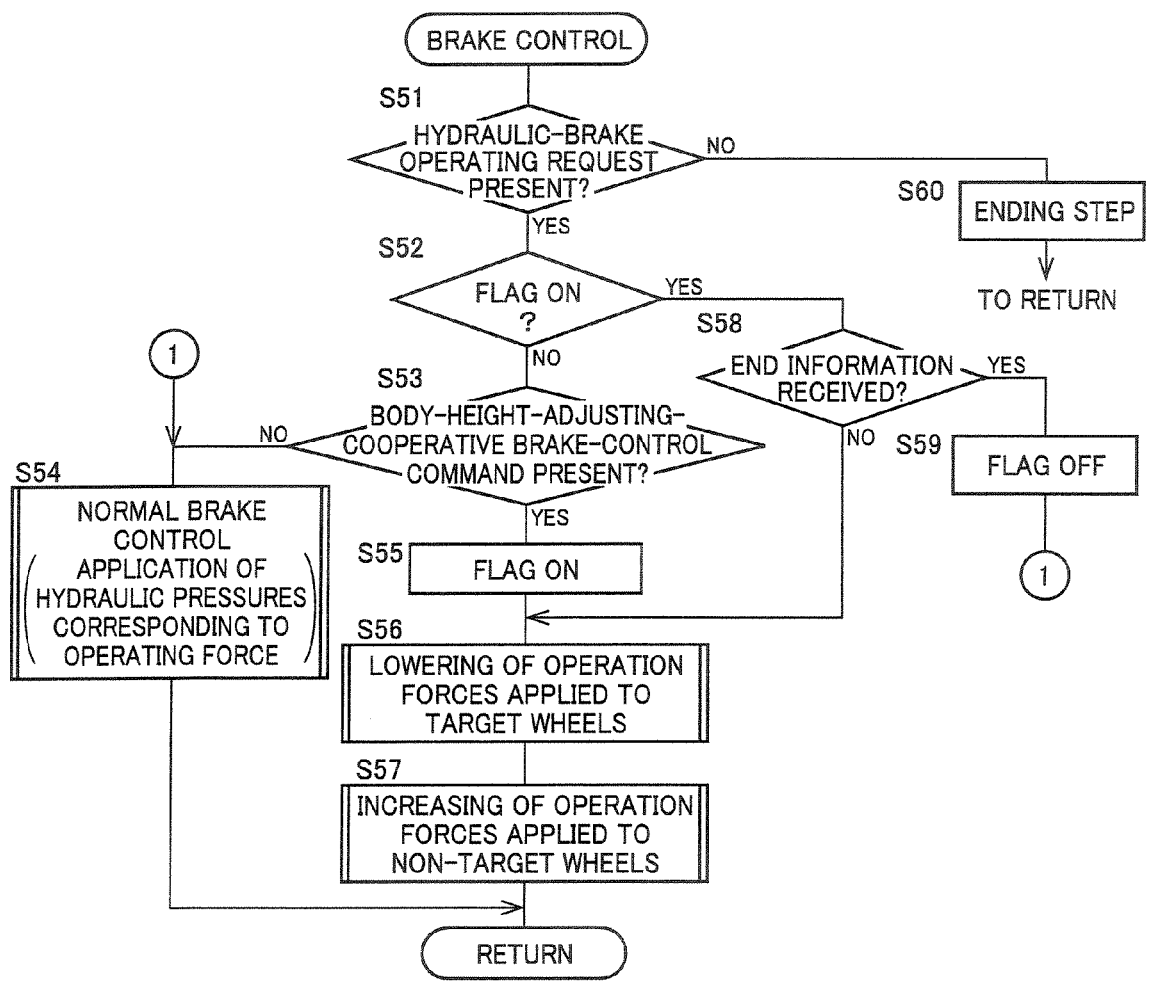
FIG. 11 is a flow chart representing a brake control program stored by a brake ECU as another portion of the vehicle control system.

The data-storage portion of the body-height-adjusting ECU 150 stores a brake control program represented by a flow chart shown in FIG. 11, and other control programs.

Hereinafter, there will be described an operation of the vehicle control system constructed as described above. In the present embodiment, the body height(s) and the brake-operation forces are cooperatively controlled.

As described above, if a body-height adjusting operation is carried out to change, for at least one of the two front wheels 4 and the two rear wheels 10, a body height as a relative position between the one wheel 4, 10 and the body 28 in the vertical direction, then a relative position between the one wheel 4, 10 and the body 28 in the front-rear direction, i.e., the front-rear direction of the vehicle, is also changed and accordingly the wheel base L is changed. More specifically described, if the body-height adjusting operation is carried out with respect to either the front wheels 4 or the rear wheels 10 which do not receive the brake-operation forces, those wheels are allowed to be moved while being rotated, and accordingly the wheel base L of the vehicle is changed.

On the other hand, in a state in which both the front wheels 4 and the rear wheels 10 receive the respective brake-operation forces, the wheel base L is not allowed to be changed. Consequently a front-rear force caused by the body-height adjustment is produced between the front wheels 4 and/or the rear wheels 10, and the body 28. If the front-rear force exceeds the brake force applied to the wheels 4, 10, or the maximum frictional force produced between respective tires of the wheels 4, 10 and a road surface, the wheels 4, 10 are moved while being either rotated or not rotated. Consequently large sounds or noise are generated. Moreover, since the changing of the wheel base L is not allowed, the following problems may arise: As compared with the case where the brake-operation forces are not applied, a larger amount of the hydraulic liquid may need to be supplied to the suspension cylinders 88, 89 to increase the hydraulic pressures to higher values in order to increase the body heights by a same target amount, or a larger amount of the hydraulic liquid may need to be discharged from the suspension cylinders 88, 89 to decrease the hydraulic pressures to lower values in order to decrease the body heights by a same target amount. In those events, if the brake-operation forces are removed, the body heights would be abruptly changed. In addition, too much energy would be consumed.

Hence, in the present embodiment, in the case where the body-height adjusting operation is to be carried out, i.e., the body-height-adjusting request is present, in the state in which both the front wheels 4 and the rear wheels 10 receive the respective brake-operation forces, either the front wheels 4 or the rear wheels 10 are brought into the state in which those wheels do not receive the brake-operation forces, and accordingly the wheel base L is allowed to change.

Figure 5:
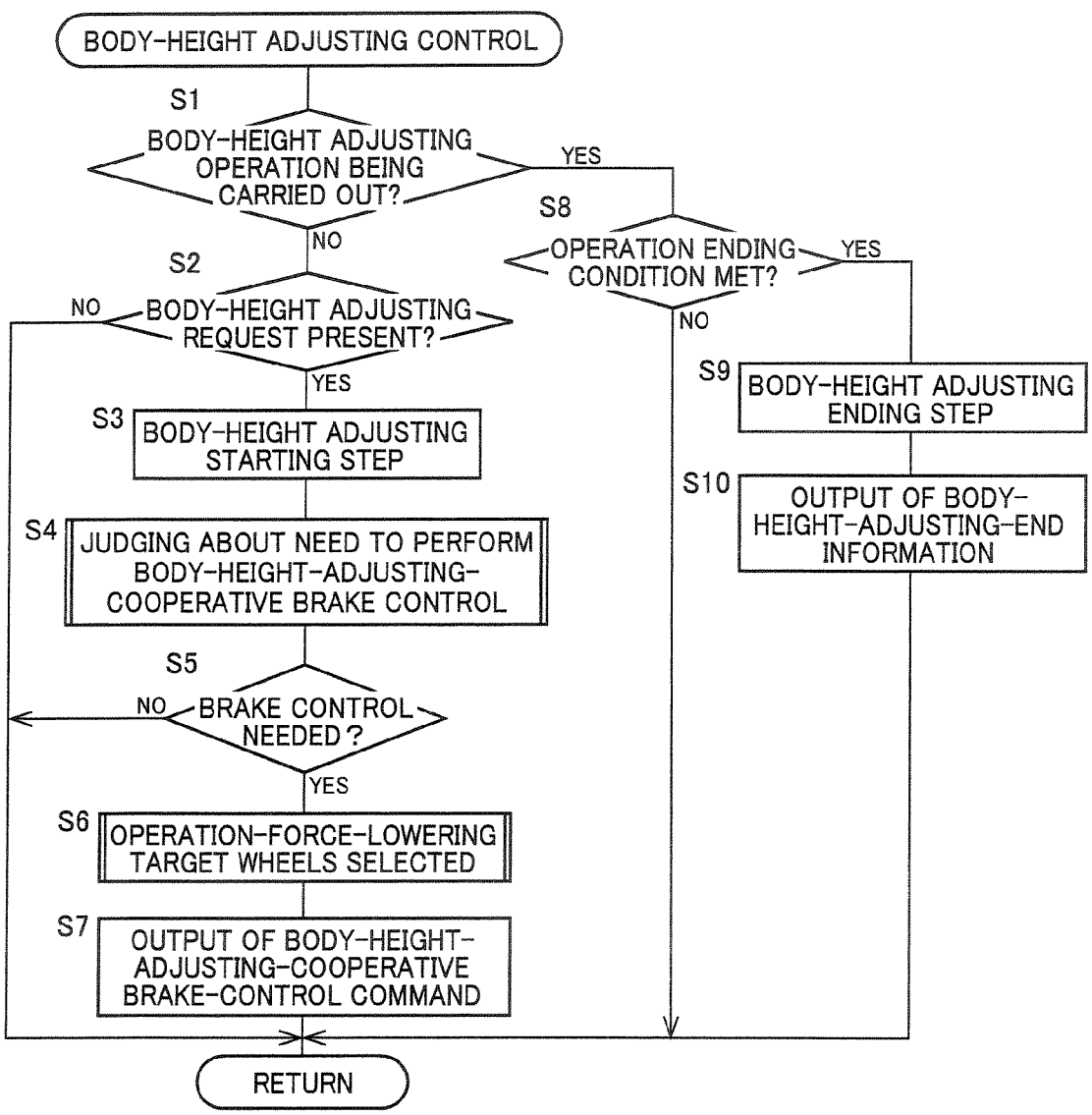
FIG. 5 is a flow chart representing a body-height adjusting program stored by a body-height adjusting ECU (electronic control unit) as a portion of the body-height adjusting device.

The body-height adjusting ECU 150 implements, at a prescribed cyclic time, a body-height adjusting program represented by a flow chart shown in FIG. 5.

First, at Step S1, the ECU 150 judges whether a body-height adjusting operation is being carried out. If a negative judgment is made at Step S1, the control of the ECU 150 goes to Step S2 to judge whether a body-height-adjusting request is present. If a positive judgment is made at Step S2, the control of the ECU 150 goes to Step S3, i.e., a body-height-adjustment starting step. In the case where a body-height increasing operation is carried out with respect to the pair of front wheels 4 and/or the pair of rear wheels 10, the pump device 102 is operated, and the body-height adjusting valves 110 and/or 112 corresponding to the front and/or rear wheels 4, 10 are opened. On the other hand, in the case where a body-height decreasing operation is carried out with respect to the front and/or rear wheels 4, 10, the body-height adjusting valves 110 and/or 112 are opened.

Next, at Step S4, the ECU 150 obtains information to be used to judge whether there is a need to perform a body-height-adjusting-cooperative brake control (hereinafter, simply referred to as the "cooperative control" where appropriate). In the present embodiment, when the body-height adjusting operation started, the ECU 150 judges whether the vehicle is in a stopped state thereof for the reason why all the four wheels 4, 10 are being braked by the corresponding hydraulic brakes 14 15. If the vehicle is in the stopped state for that reason, the ECU 150 judges that there is the need to perform the cooperative control; and if not, the ECU 150 judges that there is not the need.

Figure 6:
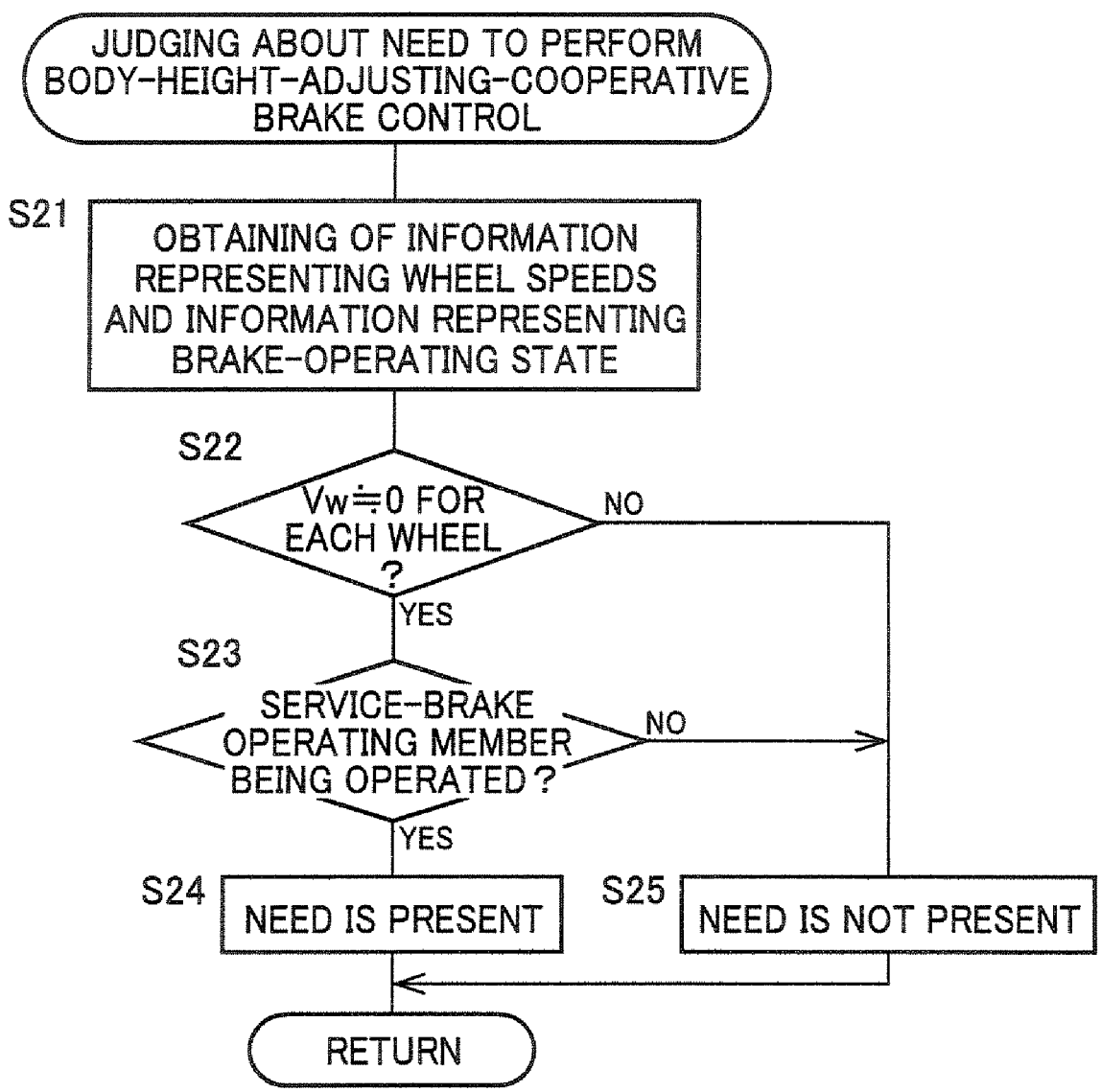
FIG. 6 is a flow chart representing a portion of the body-height adjusting program represented by the flow chart of FIG. 5, i.e., a routine of judging about a need to perform a body-height-adjusting-cooperative brake control.

FIG. 6 shows a flow chart representing Step S4. At Step S21 of FIG. 6, the body-height-adjusting ECU 150 obtains, from the information supplied from the brake ECU 152, information representing the respective rotation speeds of the four wheels 4, 10 and information representing the current operating state of the service-brake operating member 22. Then, at Step S22, the ECU 150 judges whether the respective rotation speeds of all the four wheels 4, 10 are substantially zero (or are not higher than a very low speed that can be regarded as being stopped); and at Step S23, the ECU 150 judges whether the service-brake operating member 22 is being operated by the driver, i.e., in a brake-operating state thereof commanding the respective operations of the hydraulic brakes 14, 15. If a positive judgment is made at each of Steps S22 and S23, then the control goes to Step S24 to judge that there is the need to perform the cooperative control; and if a negative judgment is made at least one of Steps S22 and S23, then the control goes to Step S25 to judge that there is not the need.

The braking system 12 may be automatically operated to brake all the four wheels 4, 10. In this case, the ECU 150 may obtain, at Step S21, information representing the respective current operation states of the four hydraulic brakes 14, 15, and may judge, at Step S23, whether all the four hydraulic brakes 14, 15 corresponding to the four wheels 4, 10 are being operated, e.g., whether all the respective hydraulic pressures in the four brake cylinders 46, 48 are not lower than a reference pressure that can be regarded as being positively produced.

Moreover, whether the vehicle is in its stopped state may be judged based on an output value of a vehicle-speed sensor that detects a speed of movement of the vehicle.

Step S4 of FIG. 5 may be modified such that if at least one of (a) a first additional condition that a target body-height-adjusting stroke determined for the body-height adjusting operation is greater than a reference value and (b) a second additional condition that the respective hydraulic pressures in the brake cylinders 46, 48 are higher than a reference pressure is satisfied, then the ECU 150 judges that there is the need to perform the cooperative control.

If at Step S4 the ECU 150 judges that there is the need to perform the cooperative control, a positive judgment is made at Step S5, and the control goes to Step S6 to select a pair of wheels the brake-operation forces applied to which are to be lowered (hereinafter, referred to as the "operation-force-lowering target wheels", where appropriate). Then, at Step S7, the body-height-adjusting ECU 150 supplies, to the brake ECU 152, information representing the operation-force-lowering target wheels, and a command (i.e., a cooperative-control command) to perform the cooperative control. On the other hand, if a negative judgment is made at Step S5, the ECU 150 does not supply the cooperative-control command. That is, if the vehicle is not in the stopped state, i.e., is moving, or if not all the hydraulic brakes 14, 15 corresponding to the four wheels 4, 10 are in their operative states, the ECU 150 does not perform the cooperative control.

Figure 7:
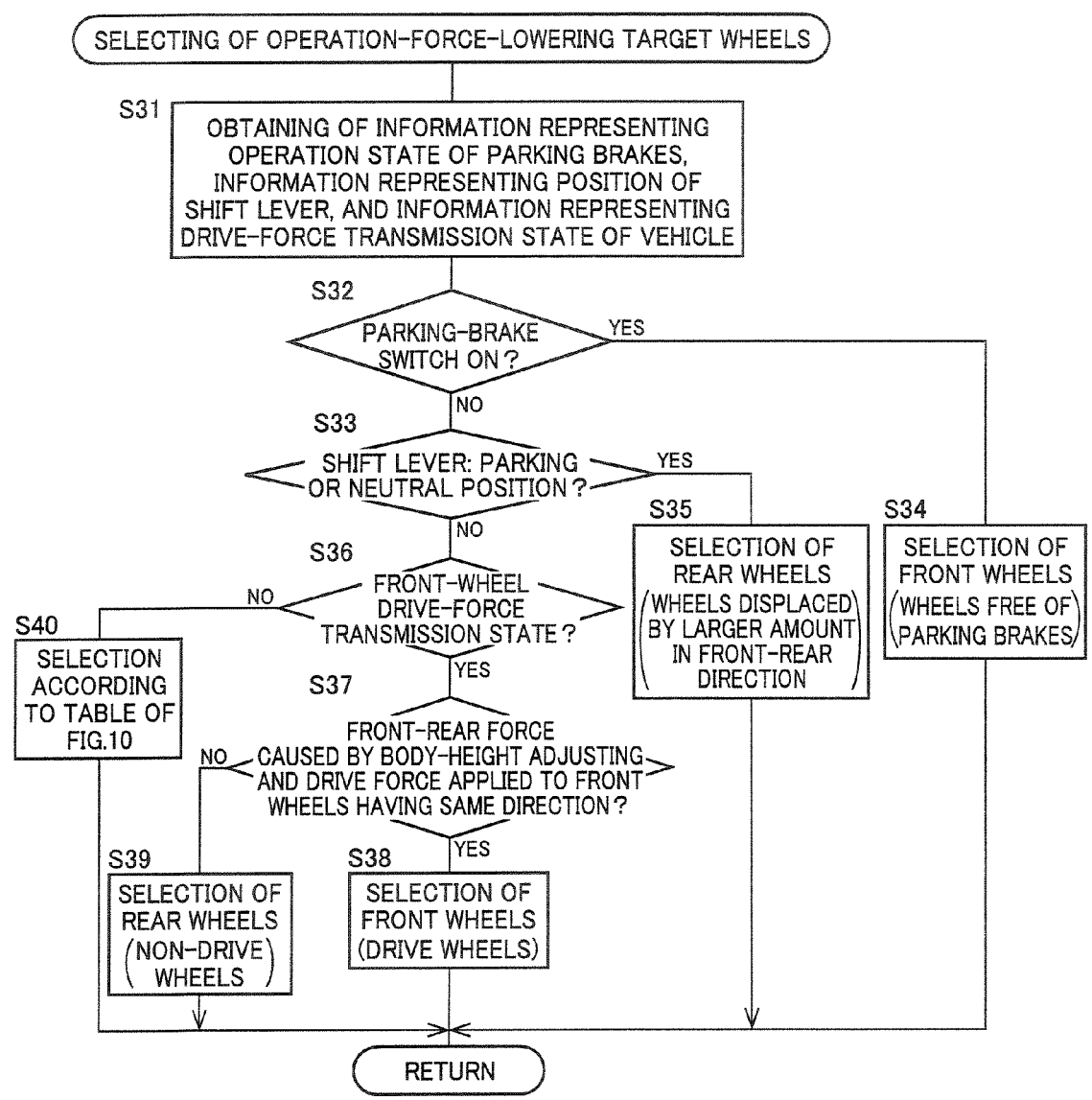
FIG. 7 is a flow chart representing another portion of the body-height adjusting program represented by the flow chart of FIG. 5, i.e., a routine of selecting operation-force-lowering target wheels.

FIG. 7 shows a flow chart representing Step S6. At Step S31, the body-height adjusting ECU 150 obtains information representing the current operating state of the parking-brake operating member 20 (this information is supplied from the brake ECU 152), information representing the current position of the shift lever, and information representing the current drive-force transmission state of the drive-force transmission device 8 or the vehicle (this information is supplied from the drive-force transmission ECU 156). At Step S32, the ECU 150 judges whether the parking-brake operating member 20 is in an operative state thereof, i.e., whether the parking-brake switch 76 is in its "ON" state; and at Step S33, the ECU 150 judges whether the drive source 6 is in an operative state thereof and simultaneously the shift lever is in the parking or neutral position. Whether the drive source 6 is in its operative state may be judged based on information supplied from the drive ECU 154. Alternatively, in the case where the body-height-adjusting-request obtaining device 172 includes an engine-ignition switch, whether the drive source 6 is in its operative state may be judged based on information indicating whether the ignition switch is in an ON state thereof or an OFF state thereof.

In the present embodiment, the parking brakes 16 are mechanical ones, and accordingly the tension of the cable 18 cannot be automatically lowered. Therefore, when the parking brakes 16 are in their operative states, the respective operation forces of the hydraulic brakes 15 corresponding to the rear wheels 10 can be lowered, but the respective operation forces of the parking brakes 16 cannot be lowered. Thus, at Step S34, the ECU 150 selects the pair of front wheels 4 as the operation-force-lowering target wheels.

In addition, when the shift lever is in the parking or neutral position, i.e., when the drive force of the drive source 6 is not transmitted to either the front wheels 4 nor the rear wheels 10, the ECU 150 selects, as the operation-force-lowering target wheels, either the front wheels 4 or the rear wheels 10 that are displaced relative to the vehicle's body 28 by a greater amount in the front-rear direction when the respective body heights corresponding to the two front wheels 4 and the respective body heights corresponding the two rear wheels 10 are changed by a same amount. As described previously by reference to FIGS. 14A and 14B, the pair of rear wheels 10 are selected, in the present embodiment, as the operation-force-lowering target wheels because of the difference of the respective sorts of the respective suspensions corresponding to the front wheels 4 and the rear wheels 10.

Moreover, when the shift lever is not in the parking or neutral position, i.e., when the drive force of the drive source 6 is transmitted to the drive wheels, the ECU 150 judges, at Step S36, whether the drive-force transmission device 8 is in the front-wheel drive-force transmission state or the four-wheel drive-force transmission state, based on the current state of the drive-force transmission state selecting switch 11. In the case where the transmission device 8 is in the front-wheel drive-force transmission state, i.e., the drive wheels are the front wheels 4 only, a positive judgment is made at Step S36, and the control goes to Step S37 to obtain a direction of the front-rear force applied to the front wheels 4 by the body-height adjusting operation and judge whether the obtained direction of the front-rear force is the same as the direction of the drive force transmitted to the front wheels 4. If a positive judgment is made at Step S37, the control goes to Step S38 to select the front wheels 4 (i.e., the drive wheels) as the operation-force-lowering target wheels. On the other hand, if a negative judgment is made at Step S37, the control goes to Step S39 to select the rear wheels 10 (i.e., the non-drive wheels) as the operation-force-lowering target wheels. Meanwhile, in the case where the drive-force transmission device 8 is in the four-wheel drive-force transmission state, i.e., the drive wheels are all the four wheels 4, 10, a negative judgment is made at Step S36, and the control goes to Step S40 to select, as the operation-force-lowering target wheels, either the front wheels 4 or the rear wheels 10 to which the front-rear force is applied by the body-height adjusting operation such that a direction of the front-rear force is the same as the direction of the drive force transmitted thereto.

In the present embodiment, at Step S40, the ECU 150 selects the operation-force-lowering target wheels, based on the wheels corresponding to the body heights to be adjusted according to the body-height-adjusting request obtained at the time when the body-height adjusting operation is started; the respective actual values of those body heights at that time; and the respective target values of the same. For example, in the case where a request to increase the respective body heights corresponding to all the four wheels 4, 10 is present, the hydraulic liquid may be simultaneously supplied to the four suspension cylinders 88, 89, may be supplied to the two suspension cylinders 88 corresponding to the two front wheels 4, or may be supplied to the two suspension cylinders 89 corresponding to the two rear wheels 10, as described above. However, the operation-force-lowering target wheels are not selected based on the way how the hydraulic liquid is actually supplied or discharged to or from the suspension cylinders 88, 89 in the body-height adjusting operation, but are selected according to the body-height-adjusting request. Therefore, the operation-force-lowering target wheels that have been selected for each body-height-adjusting operation are not changed during the each body-height-adjusting operation.

Figure 8A:
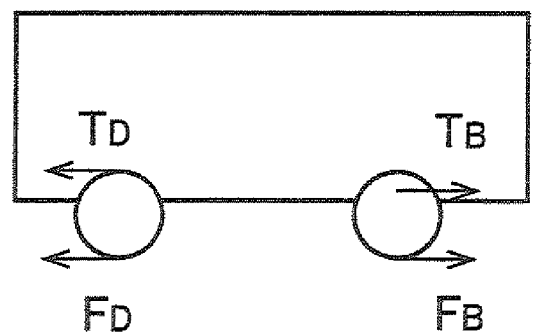
FIGS. 8A, 8B, and 8C are views for explaining a front-rear force caused by adjusting of a body height(s)

As shown in FIG. 8A, when the shift lever is in the drive position or range (D), a drive torque, $T_D$, is transmitted to each drive wheel. A drive force, $F_D$, is a frictional force produced between the tire of the each drive wheel and the road surface. A brake torque, $T_B$, is a product of a brake-operation force and a radius to which the brake-operation force is applied or inputted. A brake force, $F_B$, is a frictional force produced between each wheel and the road surface, i.e., a reaction force produced against a force applied to the each wheel in the front-rear direction (e.g., the front-rear force caused by the adjusting of body height(s), or the drive force $F_D$).

Figure 8B:
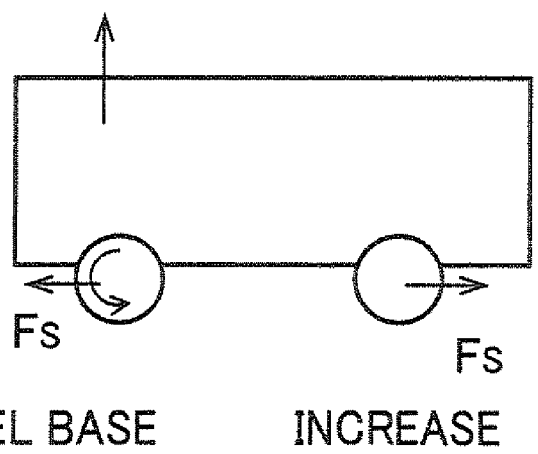

For example, as shown in FIG. 8B, when the body heights corresponding to the front wheels 4 are adjusted to increase from respective normal height positions, the front wheels 4 are moved frontward, as shown in FIG. 14A, so that the wheel base of the vehicle increases. However, when the brake-operation forces are being applied to the four wheels 4, 10, the changing of the wheel base is not permitted and accordingly a front-rear force, $F_S$, is produced in a direction to increase the wheel base. The front-rear force $F_S$ is a force to move the front wheels 4 frontward, i.e., a force to move the rear wheels 10 rearward. If the vehicle is in the front-wheel drive-force-transmission state, the direction of the front-rear force $F_S$ applied to the front wheels 4 by the adjusting of the body heights and the direction of the drive force $F_D$ transmitted to the front wheels 4 are same as each other. Therefore, the front wheels 4 are selected as the operation-force-lowering target wheels. Since the respective directions of the front-rear force $F_S$ and the drive force $F_D$ are same, the front wheels 4 can be easily moved. For example, the front wheels 4 may be moved without needing to lower the brake-operation forces, or may be moved with respective small amounts of lowering of the brake-operation forces.

Figure 8C:
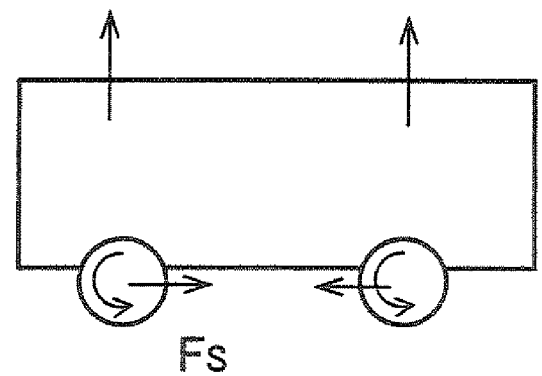

As shown in FIG. 8C, when the body heights corresponding to the four wheels 4, 10 are adjusted to increase from the respective normal height positions, both the front wheels 4 and the rear wheels 10 are displaced frontward, as shown in FIGS. 14A and 14B. In addition, a rate of displacing of the rear wheels 10 is greater than that of the front wheels 4. Therefore, when the brake torques $T_B$ are applied to both the front wheels 4 and the rear wheels 10, a front-rear force $F_S$ is produced in a direction to decrease the wheel base. The front-rear force $F_S$ is a force to move the front wheels 4 rearward, i.e., a force to move the rear wheels 10 frontward. Then, if the vehicle is in the front-wheel drive-force-transmission state, the direction of the front-rear force $F_S$ applied to the front wheels 4 by the adjusting of the body heights and the direction of the drive force $F_D$ transmitted to the front wheels 4 are opposite to each other. Therefore, the rear wheels 10 are selected as the operation-force-lowering target wheels. Meanwhile, if the vehicle is in the four-wheel drive-force-transmission state, then the direction of the front-rear force $F_S$ applied to the front wheels 4 and the direction of the drive force $F_D$ transmitted to the front wheels 4 are opposite to each other, but the direction of the front-rear force $F_S$ applied to the rear wheels 10 and the direction of the drive force $F_D$ transmitted to the rear wheels 10 are same as each other. Therefore, the rear wheels 10 are selected as the operation-force-lowering target wheels.

Figure 9:
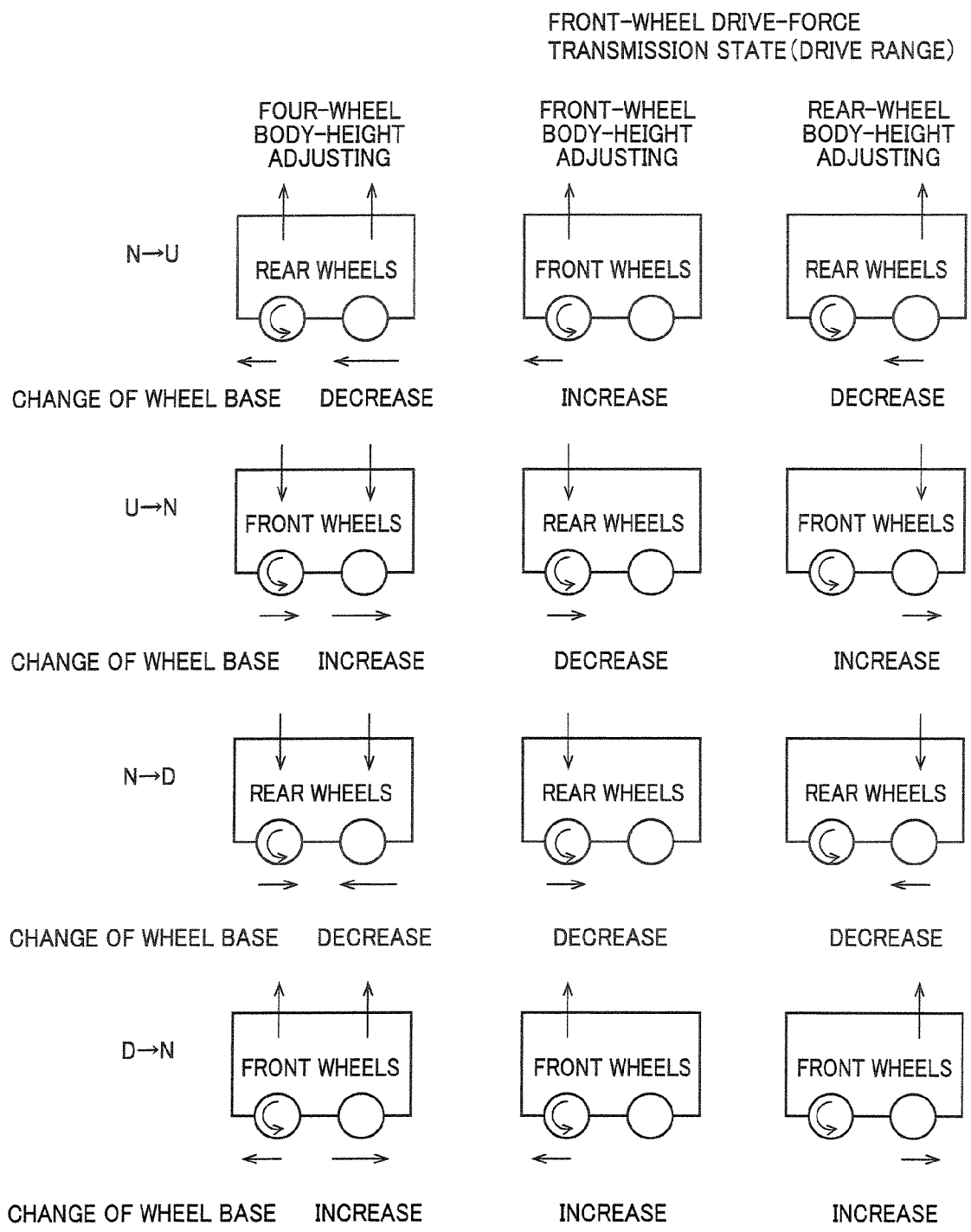
FIG. 9 is a view for explaining exemplary manners in which operation-force-lowering target wheels are selected in a front-wheel drive-force transmission state of the vehicle.

FIG. 9 shows exemplary manners in which the operation-force-lowering target wheels are selected when the vehicle is in the front-wheel drive-force transmission state, the shift lever is in the drive range (D), and the body heights are adjusted. Here, it is noted that when the body heights corresponding to only one pair of wheels out of the pair of front wheels 4 and the pair of rear wheels 10 are adjusted, then the body heights corresponding to the other pair of wheels may be changed because of, e.g., a movement of the load applied to the vehicle as a whole. However, in the present embodiment, the changing of the body heights corresponding to the other pair of wheels are not taken into account, for easier understanding purposes only. In addition, here it is assumed that when the four body heights corresponding to the two pairs of wheels 4, 10 are adjusted, the respective values of those body heights when the adjusting is started are equal to each other, and the respective values of those body heights when the adjusting is ended are equal to each other, that is, the respective target body-height adjusting strokes of the four wheels 4, 10 are equal to each other.

First, there will be described the case where the body-height-adjusting target wheels are the front wheels 4. In the state in which the brake-operation forces are applied to the four wheels 4, 10, when the body heights corresponding to the front wheels 4 are adjusted to increase from respective normal height positions, N, to respective higher height positions, U, the front wheels 4 are selected as the operation-force-lowering target wheels, as described above by reference to FIG. 8B. On the other hand, when the body heights corresponding to the front wheels 4 are adjusted to decrease from the respective higher height positions U to the respective normal height positions N, a front-rear force $F_S$ is produced in a direction to decrease the wheel base. In this case, the direction of the front-rear force $F_S$ applied to the front wheels 4 and the direction of the drive force $F_D$ transmitted to the front wheels 4 are opposite to each other. Therefore, the rear wheels 10 as non-drive wheels are selected as the operation-force-lowering target wheels. In addition, when the body heights corresponding to the front wheels 4 are adjusted to decrease from the respective normal height positions N to respective lower height positions, D, a front-rear force $F_S$ is produced in a direction to decrease the wheel base. Therefore, the rear wheels 10 as the non-drive wheels are selected as the operation-force-lowering target wheels. Moreover, when the body heights corresponding to the front wheels 4 are adjusted to increase from the respective lower height positions D to the respective normal height positions N, a front-rear force $F_S$ is produced in a direction to increase the wheel base. Therefore, the front wheels 4 as the drive wheels are selected as the operation-force-lowering target wheels.

Second, there will be described the case where the body-height-adjusting target wheels are the rear wheels 10. In the state in which the brake-operation forces are applied to the four wheels 4, 10, when the body heights corresponding to the rear wheels 10 are adjusted to increase from respective normal height positions N to respective higher height positions U, a front-rear force $F_S$ is produced in a direction to decrease the wheel base. In this case, the direction of the front-rear force $F_S$ applied to the front wheels 4 as the drive wheels and the direction of the drive force $F_D$ transmitted to the front wheels 4 are opposite to each other. Therefore, the rear wheels 10 are selected as the operation-force-lowering target wheels. On the other hand, when the body heights corresponding to the rear wheels 10 are adjusted to decrease from the respective higher height positions U to the respective normal height positions N, a front-rear force $F_S$ is produced in a direction to move the rear wheels 10 rearward, i.e., increase the wheel base. In this case, the direction of the front-rear force $F_S$ applied to the front wheels 4 and the direction of the drive force $F_D$ transmitted to the front wheels 4 are same as each other. Therefore, the front wheels 4 are selected as the operation-force-lowering target wheels. In addition, when the body heights corresponding to the rear wheels 10 are adjusted to decrease from the respective normal height positions N to respective lower height positions D, a front-rear force $F_S$ is produced in a direction to decrease the wheel base. Therefore, the rear wheels 10 are selected as the operation-force-lowering target wheels. Moreover, when the body heights corresponding to the rear wheels 10 are adjusted to increase from the respective lower height positions D to the respective normal height positions N, a front-rear force $F_S$ is produced in a direction to increase the wheel base. Therefore, the front wheels 4 are selected as the operation-force-lowering target wheels.

Third, there will be described the case where the body-height-adjusting target wheels are the front and rear, i.e., four wheels 4, 10. In the state in which the brake-operation forces are applied to the four wheels 4, 10, when the body heights corresponding to the four wheels 4, 10 are adjusted to increase from the respective normal height positions N to the respective higher height positions U, the rear wheels 10 are selected as the operation-force-lowering target wheels, as described above by reference to FIG. 8C. On the other hand, when the body heights corresponding to the four wheels 4, 10 are adjusted to decrease from the respective higher height positions U to the respective normal height positions N, the four wheels 4, 10 are displaced rearward such that a rate of displacing of the rear wheels 10 in the front-rear direction is greater than that of the front wheels 4. Therefore, a front-rear force $F_S$ is produced in a direction to increase the wheel base. In this case, the direction of the front-rear force $F_S$ applied to the front wheels 4 and the direction of the drive force $F_D$ transmitted to the front wheels 4 are same as each other. Therefore, the front wheels 4 are selected as the operation-force-lowering target wheels. In addition, when the body heights corresponding to the four wheels 4, 10 are adjusted to decrease from the respective normal height positions N to the respective lower height positions D, a front-rear force $F_S$ is produced in a direction to decrease the wheel base. Therefore, the rear wheels 10 are selected as the operation-force-lowering target wheels. Moreover, when the body heights corresponding to the four wheels 4, 10 are adjusted to increase from the respective lower height positions D to the respective normal height positions N, a front-rear force $F_S$ is produced in a direction to increase the wheel base. Therefore, the front wheels 4 are selected as the operation-force-lowering target wheels.

Thus, in the case where the vehicle is in the front-wheel drive-force transmission state and the shift lever is in the drive range (D), if the adjusting of body heights results in producing the front-rear force $F_S$ in the direction to increase the wheel base, the direction of the front-rear force $F_S$ applied to the front wheels 4 and the direction of the drive force $F_D$ transmitted to the front wheels 4 are same as each other. Therefore, the front wheels 4 as the drive wheels are selected as the operation-force-lowering target wheels. On the other hand, if the adjusting of body heights results in producing the front-rear force $F_S$ in the direction to decrease the wheel base, the direction of the front-rear force $F_S$ applied to the front wheels 4 and the direction of the drive force $F_D$ transmitted to the front wheels 4 are opposite to each other. Therefore, the rear wheels 10 as the non-drive wheels are selected as the operation-force-lowering target wheels.

Meanwhile, in the case where the vehicle is in the front-wheel drive-force transmission state and the shift lever is in a reverse position or range (R), a drive force $F_D$ transmitted to the front wheels 4 has a direction opposite to the direction of the drive force $F_D$ shown in FIG. 8A. Therefore, if the adjusting of body heights results in producing a front-rear force $F_S$ in a direction to increase the wheel base, a direction of the front-rear force $F_S$ applied to the front wheels 4 and the direction of the drive force $F_D$ transmitted to the front wheels 4 are opposite to each other. Therefore, the rear wheels 10 as the non-drive wheels are selected as the operation-force-lowering target wheels. On the other hand, if the adjusting of body heights results in producing a front-rear force $F_S$ in a direction to decrease the wheel base, the direction of the front-rear force $F_S$ applied to the front wheels 4 and the direction of the drive force $F_D$ transmitted to the front wheels 4 are same as each other. Therefore, the front wheels 4 as the drive wheels are selected as the operation-force-lowering target wheels. However, regarding this case, no description of exemplary manners similar to the exemplary manners described above by reference to FIG. 9 is provided.

Figure 10:
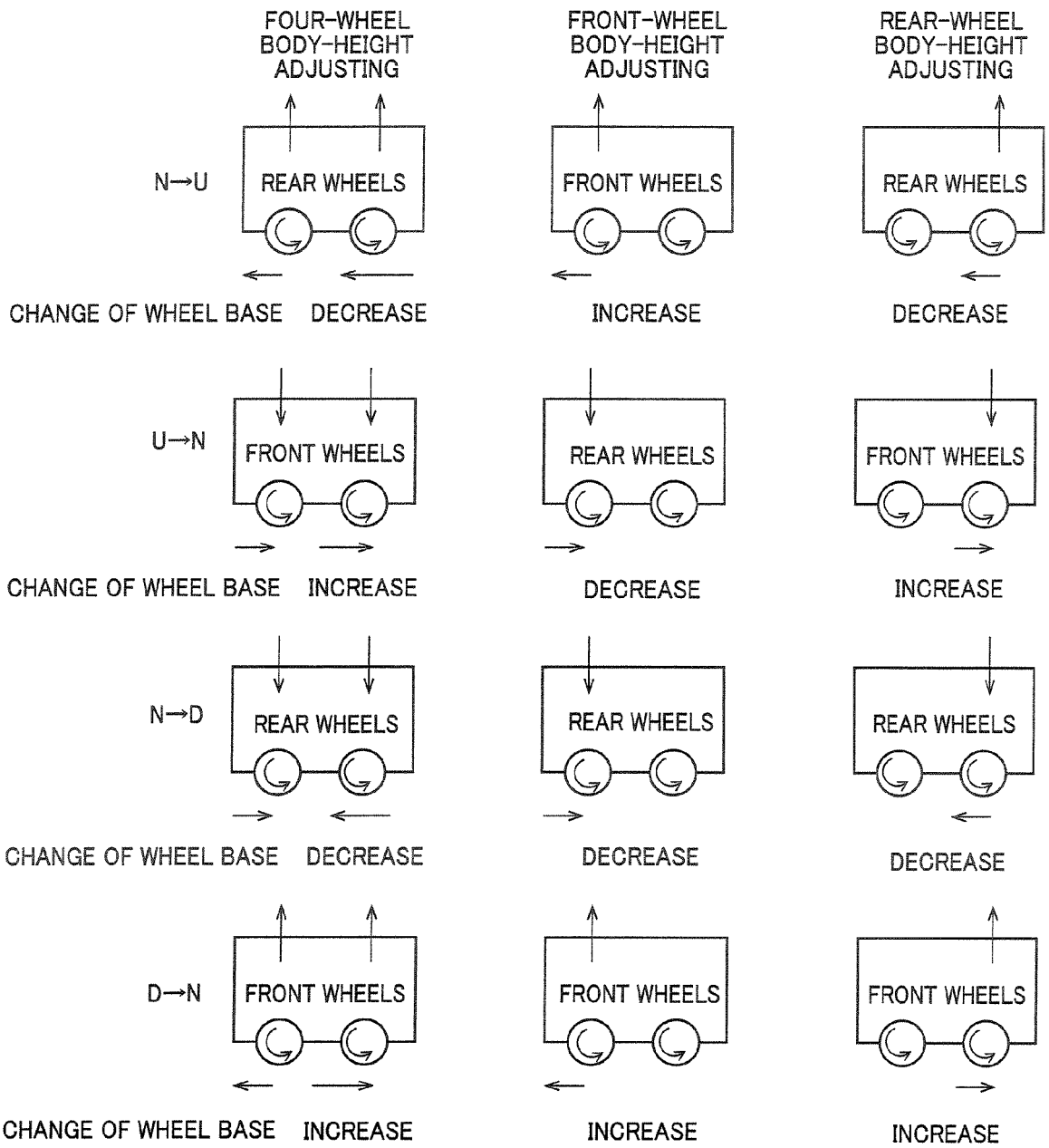
FIG. 10 is a view for explaining exemplary manners in which operation-force-lowering target wheels are selected in a four-wheel drive-force transmission state of the vehicle.

FIG. 10 shows exemplary manners in which operation-force-lowering target wheels are selected when the vehicle is in the four-wheel drive-force transmission state, the shift lever is in the drive range (D), and the body heights are adjusted. In this case, respective directions of a drive force $F_D$ applied to the front wheels 4 and a drive force $F_D$ applied to the rear wheels 10 are same as each other. Therefore, a direction of a front-rear force $F_S$ caused by the adjusting of body heights is same as either one of the respective directions of the drive force $F_D$ applied to the front wheels 4 and the drive force $F_D$ applied to the rear wheels 10. Therefore, one pair of wheels 4 or 10 receiving the drive force $F_D$ whose direction is the same as the direction of the front-rear force $F_S$ is selected as the operation-force-lowering target wheels.

In the state in which the brake-operation forces are applied to the four wheels 4, 10, when the body heights corresponding to the front wheels 4 are adjusted to increase from the respective normal height positions N to the respective higher height positions U, a front-rear force $F_S$ is produced in a direction to increase the wheel base. In this case, the direction of the front-rear force $F_S$ applied to the front wheels 4 and the direction of the drive force $F_D$ transmitted to the front wheels 4 are same as each other. Therefore, the front wheels 4 are selected as the operation-force-lowering target wheels. On the other hand, when the body heights corresponding to the front wheels 4 are adjusted to decrease from the respective higher height positions U to the respective normal height positions N, a front-rear force $F_S$ is produced in a direction to decrease the wheel base. In this case, the direction of the front-rear force $F_S$ applied to the front wheels 4 and the direction of the drive force $F_D$ transmitted to the front wheels 4 are opposite to each other. On the other hand, the direction of the front-rear force $F_S$ applied to the rear wheels 10 and the direction of the drive force $F_D$ transmitted to the rear wheels 10 are same as each other. Therefore, the rear wheels 10 are selected as the operation-force-lowering target wheels.

Similarly, if the adjusting of body heights results in producing a front-rear force $F_S$ in a direction to decrease the wheel base, then the rear wheels 10 are selected as the operation-force-lowering target wheels; and if the adjusting of body heights results in producing a front-rear force $F_S$ in a direction to increase the wheel base, then the front wheels 4 are selected as the operation-force-lowering target wheels.

Moreover, in the case where the vehicle is in the front-wheel drive-force transmission state and the shift lever is in the reverse range (R), respective drive forces $F_D$ transmitted to the front and rear wheels 4, 10 have respective directions opposite to the respective directions of the drive forces $F_D$ transmitted to the same 4, 10 when the shift lever is in the drive range (D). In this case, too, the operation-force-lowering target wheels are selected in the same manners as descried above. That is, if the adjusting of body heights results in producing a front-rear force $F_S$ in a direction to decrease the wheel base, then the rear wheels 10 are selected as the operation-force-lowering target wheels; and if the adjusting of body heights results in producing a front-rear force $F_S$ in a direction to increase the wheel base, then the front wheels 4 are selected as the operation-force-lowering target wheels. However, regarding this case, no description of exemplary manners similar to the exemplary manners described above by reference to FIG. 10 is provided.

As shown in FIGS. 9 and 10, the same results are obtained irrespective of which one of the following two rules may be selected; the first rule, for the case where the vehicle is in the front-wheel drive-force transmission state, that if the respective directions of the drive force and the front-rear force each applied to the drive wheels are same as each other, the drive wheels are selected as the operation-force-lowering target wheels and, if not, the non-drive wheels are selected as the operation-force-lowering target wheels, or the second rule, for the case where the vehicle is in the four-wheel drive-force transmission state, that the drive wheels receiving the drive force whose direction is same as the direction of the front-rear force are selected as the operation-force-lowering target wheels. Therefore, based on only the result obtained by judging whether the direction of the front-rear force caused by the adjusting of body heights is to increase or decrease the wheel base, and the result obtained by judging whether the shift lever is in the drive range (D) or the reverse range (R), the operation-force-lowering target wheels can be selected in the common manners.

In the present embodiment, each time one body-height adjusting request is obtained, a pair of operation-force-lowering target wheels are selected once only. Therefore, when one body-height adjusting operation is carried out, the operation-force-lowering target wheels once selected are kept, i.e., are not changed. More specifically explained, during one body-height adjusting operation, the body heights corresponding to the front wheels 4 may be changed and then the body heights corresponding to the rear wheels 10 may be changed. However, the operation-force-lowering target wheels once selected for the body-height adjusting operation are not changed. Therefore, in the present embodiment, the energy consumption needed to control the hydraulic brakes 14, 15 can be reduced as compared with the case where operation-force-lowering target wheels are changed each time a body-height-adjusting target wheel or wheels is or are changed.

On the other hand, if a body-height adjusting operation is not being carried out, and if a body-height adjusting request is not present, i.e., if a positive judgment is made at each of Steps S1 and S2, the control of the ECU 150 does not go to Step S3 and the following steps.

If a positive judgment is made at Step S1, the control of the ECU 150 goes to Step S8 to judge whether a body-height-adjusting ending condition has been met. If an actual body height has substantially reached a target body height, a positive judgment is made at Step S8, and the control goes to Step S9. On the other hand, if a negative judgment is made at Step S8, the current body-height adjusting operation is continued. At Step S9, the ECU 150 carries out a body-height-adjusting ending step. If the current body-height adjusting operation is to increase the body height, the pump device 102 is placed in its inoperative position, and the body-height adjusting valves corresponding to the body-height-adjusting target wheels are placed in their closed positions. In the present embodiment, a body-height-adjusting ending condition for the case where there are a plurality of body-height-adjusting target wheels is that respective actual body heights of all the target wheels have substantially reached respective target body heights of the same and accordingly one body-height adjusting operation can be ended. Step S9 is followed by Step S10 where the body-height adjusting ECU 150 outputs, to the brake ECU 152, body-height-adjusting-end information indicating that the current body-height adjusting operation has been ended. In the case where the cooperative control has been performed during the current body-height adjusting operation, the body-height-adjusting-end information functions as a cooperative-control ending command.

However, the flow chart of FIG. 5 may be modified such that each time a negative judgment is made at Step S8, i.e., each time the body-height-adjusting ending condition is judged as having not been met, the control of the ECU 150 goes to Step S4 to make a judgment about a need to perform the body-height-adjusting-cooperative brake control.

In addition, the flow chart of FIG. 5 may be modified such that brake-operation-force-lowering target wheels are selected, during one body-height adjusting operation, each time the current suspension cylinders 88 or 89 into, or from, which the hydraulic liquid flows are changed to the other suspension cylinders 89 or 89. In the case where the brake-operation-force-lowering target wheels are selected at Steps S32 to S35, the selected target wheels are not changed even if the current suspension cylinders 88, 89 into, or from, which the hydraulic liquid flows may be changed to the other suspension cylinders 89, 88. On the other hand, in the case where brake-operation-force-lowering target wheels are selected at Steps S36 to S40, the currently selected target wheels may be changed to the other target wheels if the current suspension cylinders 88, 89 into, or from, which the hydraulic liquid flows are changed to the other suspension cylinders 89, 88. For example, in the case where a body-height adjusting request to adjust the four body heights corresponding to the four wheels 4, 10 is judged as being present, and the four body heights are increased individually, i.e., sequentially, when the hydraulic liquid flows into the suspension cylinders 88 corresponding to the front wheels 4, the front wheels 4 are selected as the brake-operation-force-lowering target wheels; and when the hydraulic liquid flows into the suspension cylinders 89 corresponding to the rear wheels 10, the rear wheels 10 are selected as the brake-operation-force-lowering target wheels.

The brake ECU 150 implements, at a prescribed cyclic time, a brake control program represented by a flow chart shown in FIG. 11.

In the present embodiment, when the body-height-adjusting ECU 150 supplies, to the brake ECU 152, the cooperative-control command and the information representing the operation-force-lowering target wheels, the brake ECU 152 operates for lowering the operation forces of either the front-wheel hydraulic brakes 14 or the operation forces of the rear-wheel hydraulic brakes 15 that correspond to the operation-force-lowering target wheels represented by the supplied information. On the other hand, when no cooperative-control command is supplied to the brake ECU 152, a normal brake control (i.e., a brake control different from the body-height-adjusting-cooperative brake control) is performed. As described previously, before the limit of boosting of the booster 37 has been reached, the pump devices 38, 40 are in their inoperative states, the hydraulic control valves 50, 51 are in their closed states, the pressure-hold valves 56, 60 are in their open states, and the pressure-decrease valves 58, 62 are in their closed states, that is, those devices and valves 38, 40, 50, 51, 56, 60, 58, 62 are in their initial positions as shown in FIG. 3. That is, the hydraulic pressure produced in the master cylinder 36 is directly transmitted to the brake cylinders 46, 48, and the hydraulic brakes 14, 15 corresponding to the front and rear wheels 4, 10 are operated. On the other hand, after the limit of boosting of the booster 37 has been reached, the pump devices 38, 40 are operated, and the electric currents supplied to the hydraulic control valves 50, 51 are controlled such that the hydraulic pressures in the brake cylinders 46, 48 are increased up to the same values as the values to which those hydraulic pressures would be increased if the operating force applied to the service-brake operating member 22 could be boosted by the booster 37 at the same rate as the rate before the limit of boosting is reached.

First, at Step S51, the brake ECU 152 judges whether a service-brake operating request is present. In the present embodiment, if the service-brake operating member 22 is in its brake-operating state commanding the operations of the hydraulic brakes 14, 15 (e.g., in the case where the service-brake operating member 22 is a brake pedal, the brake-operating state of the brake pedal is a depressed state thereof), a positive judgment is made at Step S51, and the control of the brake ECU 152 goes to Step S52 to judge whether a body-height-adjusting-cooperative-brake-control flag (i.e., a cooperative-control flag) is in its ON state. If a negative judgment is made at Step S52, the control goes to Step S53 to judge whether the brake ECU 152 has received the cooperative-control command from the body-height adjusting ECU 150. If a negative judgment is made at Step S53, the control goes to Step S54 to perform the above-described normal brake control.

On the other hand, if a positive judgment is made at Step S53, the control goes to Step S55 to set the cooperative-control flag) to its ON state, further goes to Step S56 to perform a brake-operation-force lowering control with respect to the operation-force-lowering target wheels, and further goes to Step S57 to perform a brake-operation-force increasing control with respect to non-target wheels different from the operation-force-lowering target wheels.

Figure 12:
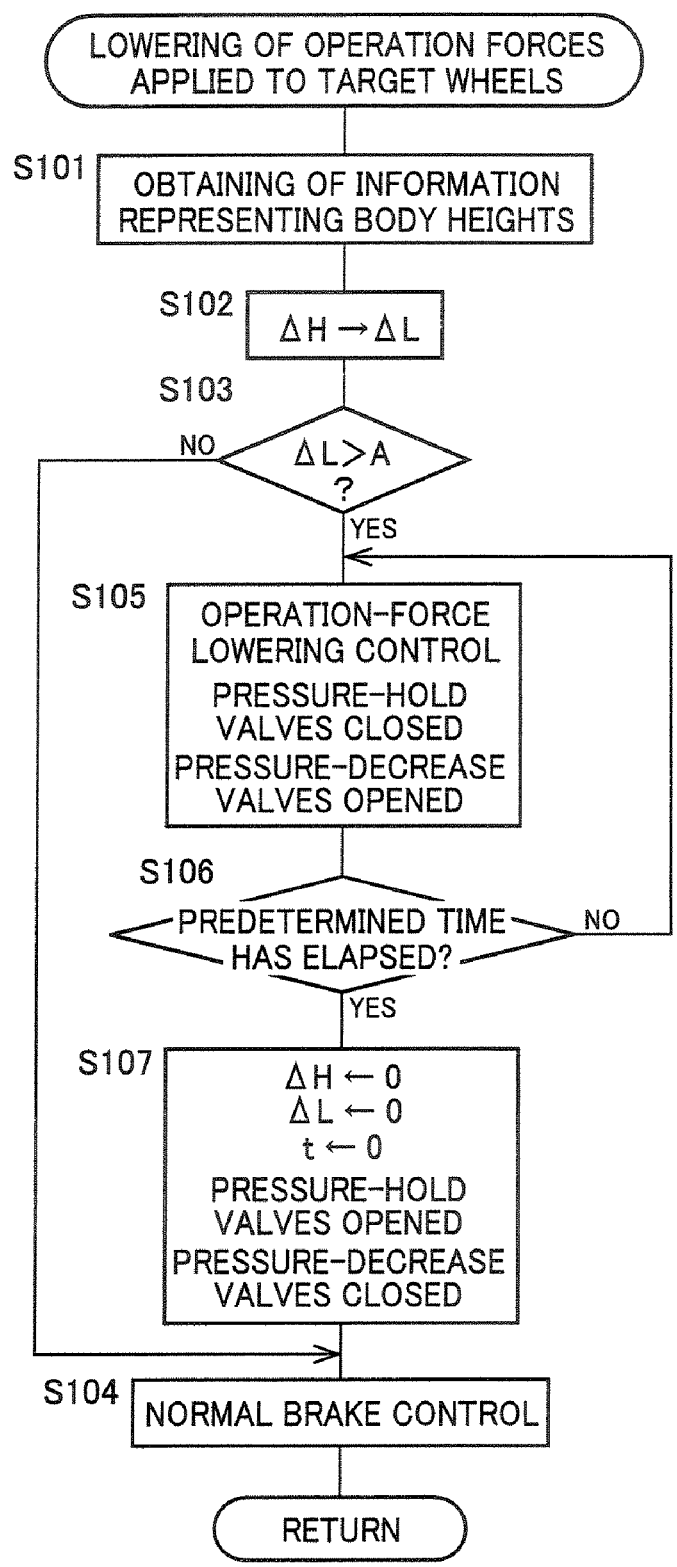
FIG. 12 is a flow chart representing a portion of the brake control program represented by the flow chart of FIG. 11, i.e., a brake-operation-force lowering control.

The brake-operation-force lowering control at Step S56 is performed according to a flow chart shown in FIG. 12. In the present embodiment, when an amount of change of the wheel base L of the vehicle has reached a reference amount on an assumption that the wheels 4 and/or 10 of the vehicle are permitted to rotate, i.e., when a front-rear force $F_S$ caused by the adjusting of body heights has exceeded a reference value, the respective operation forces of the hydraulic brakes 14 or the hydraulic brakes 15 are zeroed. That is, the respective hydraulic pressures in the brake cylinders 46 or the brake cylinders 48 are decreased to the atmospheric pressure, i.e., the hydraulic brakes 14 or 15 are brought into their inoperative states. Thus, the brake-operation-force lowering control can be said as a brake stopping control.

First, at Step S101, the brake ECU 152 obtains information representing an actual body height H. At Step S102, the ECU 152 obtains an amount of change of the actual body height H, and obtains, according to the tables shown in FIGS. 14A and 14B, an amount, $\Delta L$, of change of the wheel base L of the vehicle on an assumption that no brake-operation forces are applied to the front and rear wheels 4, 10 (hereinafter, referred to as the virtual wheel-base change amount $\Delta L$). In fact, since the respective brake-operation forces are applied to the front and rear wheels 4, 10, the wheels 4, 10 are not moved in the front-rear direction and accordingly the wheel base L is not changed. As the virtual wheel-base change amount $\Delta L$ increases, amounts of elastic change of, e.g., the suspensions increase and accordingly the front-rear force $F_S$ increases. That is, it can be said that as the virtual wheel-base change amount $\Delta L$ increases, the front-rear force $F_S$ caused by the adjusting of body heights increases.

The virtual wheel-base change amount $\Delta L$ is obtained based on a change of the actual body height H. For example, in the case where the body-height-adjusting target wheels are one pair of wheels out of the pair of front wheels 4 and the pair of rear wheels 10, an actual body height H can be obtained as an average of the respective body heights of the left and right wheels of the one pair and, based on the actual body height H, an amount, $\Delta H$, of change of the actual body height H and a virtual wheel-base change amount $\Delta L$ (i.e., an amount, $\Delta L_F$, or an amount, $\Delta L_R$) are obtained according to the tables of FIGS. 14A and 14B. In addition, in the case where the body-height-adjusting target wheels are both the pair of front wheels 4 and the pair of rear wheels 10, a front-side actual body height $H_F$ can be obtained as an average of the respective body heights of the left and right front wheels 4 and, based on the front-side actual body height $H_F$, an amount, $\Delta H_F$, of change of the front-side actual body height $H_F$ and a front-side virtual wheel-base change amount $\Delta L_F$ are obtained according to the table of FIG. 14A; and similarly a rear-side actual body height $H_R$ can be obtained as an average of the respective body heights of the left and right rear wheels 10 and, based on the rear-side actual body height $H_R$, an amount, $\Delta H_R$, of change of the rear-side actual body height $H_R$ and a rear-side virtual wheel-base change amount $\Delta L_R$ are obtained according to the table of FIG. 14B. Each of the two change amounts $\Delta L_F$, $\Delta L_R$ takes a positive sign when the wheel base L increases. Based on the two change amounts $\Delta L_F$, $\Delta L_R$, a virtual wheel-base change amount $\Delta L$ of the vehicle as a whole ($\Delta L=\Delta L_F+\Delta L_R$) is obtained. Alternatively, irrespective of whether the body-height-adjusting target wheels are the pair of front wheels 4 or the pair of rear wheels 10, both a front-side actual body height $H_F$ and a rear-side actual body height $H_R$ may be obtained and, based on the two body heights $H_F$, $H_R$, a front-side virtual wheel-base change amount $\Delta L_F$ and a rear-side virtual wheel-base change amount $\Delta L_R$ may be obtained in the same manner. In this case, too, based on the thus-obtained two change amounts $\Delta L_F$, $\Delta L_R$, a virtual wheel-base change amount $\Delta L$ of the vehicle as a whole ($\Delta L=\Delta L_F+\Delta L_R$) may be obtained.

Anyhow, if the thus-obtained virtual wheel-base change amount $\Delta L$ is determined to be not greater than a reference amount, A, at Step 103, no brake-operation forces are lowered to zero. Thus, at Step S104, the ECU 152 performs the normal brake control. Meanwhile, if the virtual wheel-base change amount $\Delta L$ exceeds the reference amount A while Steps S101 through S104 are repeated, the control of the ECU 152 goes to Step S105 to perform the brake stopping control. At Step S106, the ECU 152 judges whether a predetermined time duration has passed. Before the predetermined time duration has passed, Steps S105 and S106 are repeated; and when the predetermined time duration has passed, Step S107 is carried out.

For example, in the case where the operation-force-lowering target wheels are the front wheels 4, the ECU 152 places, at Step S105, the two pressure-hold valves 56 in their closed states and places the two pressure-decrease valves 58 in their open states. Those states are kept till the predetermined time duration passes. When the predetermined time duration has passed, i.e., if a positive judgment is made at Step S106, the control goes to Step S107 to place the two pressure-hold valves 56 in their open states and place the two pressure-decrease valves 58 in their closed states. In addition, at Step S107, the obtained body-height change amount $\Delta H$, the obtained virtual wheel-base change amount $\Delta L$, and a counter, t, to measure time are each reset to zero. Then, the control goes to Step S104 to perform the normal brake control.

Thus, for the predetermined time duration, the hydraulic pressures in the brake cylinders 46 are kept to the atmospheric pressure, and accordingly the hydraulic brakes 14 are kept to their inoperative states.

When Step S56 is carried out for the next time, since the body-height change amount $\Delta H$ and the virtual wheel-base change amount $\Delta L$ have been each reset to zero at Step S107, a negative judgment is made at Step S103, and Steps S101 through S104 are repeated. Since the changing of the wheel base L is permitted, the elastically deformed suspensions are elastically restored to their initial shapes and accordingly the front-rear force $F_S$ caused by the adjusting of body heights is decreased. Meanwhile, if the adjusting of body heights is continued in the state in which the brake operation forces are applied to the four wheels 4, 10, then the front-rear force $F_S$ caused by the adjusting of body heights is gradually increased. Eventually, if the virtual wheel-base change amount $\Delta L$ exceeds the reference amount A, i.e., the front-rear force $F_S$ exceeds the reference value, the control goes to Step S105 to lower, to the atmospheric pressure, the hydraulic pressures in the brake cylinders 46, 48 corresponding to the operation-force-lowering target wheels, thereby permitting the changing of the wheel base L and the restoring of the elastically deformed suspensions.

The tables of FIGS. 14A and 14B may be stored in the data-storage portion of the brake ECU 152. In this case, the information representing the body heights H is supplied from the body-height adjusting ECU 150 to the brake ECU 152.

On the other hand, the tables of FIGS. 14A and 14B may not be stored in the brake ECU 152. In this case, the information representing the virtual wheel-base change amount $\Delta L$ may be supplied from the body-height adjusting ECU 150 to the brake ECU 152, and the information representing that the two change amounts $\Delta L$, $\Delta H$ have been each reset to zero may be outputted from the brake ECU 152 to the body-height adjusting ECU 150. Alternatively, the information representing the wheel base L corresponding to the body height H may be supplied from the body-height adjusting ECU 150 to the brake ECU 152. In the last case, the brake ECU 152 obtains the virtual wheel-base change amount $\Delta L$. Moreover, the body-height adjusting ECU 150 may be modified to carry out Steps S101 through S103 and output, at Step S105, a brake stopping command to the brake ECU 152.

Thus, in the present embodiment, each time the virtual wheel-base change amount $\Delta L$ has reached the reference amount A, the hydraulic brakes 14 or 15 corresponding to the operation-force-lowering target wheels are zeroed, that is, the brake-operation forces are intermittently zeroed. That is, the hydraulic brakes 14 or 15 corresponding to the operation-force-lowering target wheels are intermittently switched between their operative states and their inoperative states. Therefore, as compared with the case where the inoperative states of those hydraulic brakes 14 or 15 are kept, i.e., the brake-operation forces are kept to zero during the body-height adjusting operation, the changing of the wheel base L is permitted during the body-height adjusting operation, while the brake forces of the vehicle are prevented from being excessively lowered. Thus, the undesirable events can be prevented from occurring when the body-height adjusting operation is carried out during the wheel braking operation.

In the present embodiment, at Step S104 that follows Steps S105 through 107, the brake-operation forces applied to the hydraulic brakes 14 or 15 corresponding to the operation-force-lowering target wheels are increased to a first reference value equal to a value corresponding to the brake-operating state of the service-brake operating member 22, or a value smaller than the former value by a predetermined amount; and at Step S105, those brake-operation forces are lowered to a second reference value that is substantially equal to zero.

However, the brake ECU 150 may be modified such that each time the virtual wheel-base change amount $\Delta L$ reaches the reference amount A, the hydraulic pressures in the brake cylinders 46 (or 48) corresponding to the operation-force-lowering target wheels are lowered to a reference pressure smaller than a hydraulic pressure corresponding the brake-operating state of the service-brake operating member 22. More specifically described, at Step S105, the brake ECU 150 may operate for placing the two pressure-hold valves 56 (60) in their closed states and placing the two pressure-decrease valves 58 (62) in their open states, and thereby lowering the hydraulic pressures in the brake cylinders 46 (or 48), detected by the brake-cylinder hydraulic-pressure sensors 72, to the reference pressure. In this case, if the hydraulic pressures are lowered to the reference pressure, then the two pressure-decrease valves 58 (62) are placed in their closed states, so that this state is maintained. The hydraulic pressures in the brake cylinders 46 (or 48) are kept at the reference pressure for a predetermined time duration. As described above, if the front-rear force caused by the adjusting of body heights exceeds the brake force of the vehicle, the vehicle is moved. Therefore, if the brake-operation forces are lowered, then the brake force is also lowered, so that the wheels become more easily movable. As such, the undesirable events caused by the adjusting of body heights during the wheel braking operation can be restrained.

Alternatively, the brake ECU 150 may be modified to periodically switch the two pressure-decrease valves 58 (62) between their open states and their closed states at a considerably short time period, under, e.g., a duty-cycle control.

Moreover, the brake ECU 150 may be modified to control, at Step S104, the hydraulic pressures in the brake cylinders 46 (or 48) to a reference pressure. This reference pressure may be smaller than a hydraulic pressure corresponding to the brake-operating force applied by the driver to the service-brake operating member 22 when the vehicle is stopped.

Figure 13:
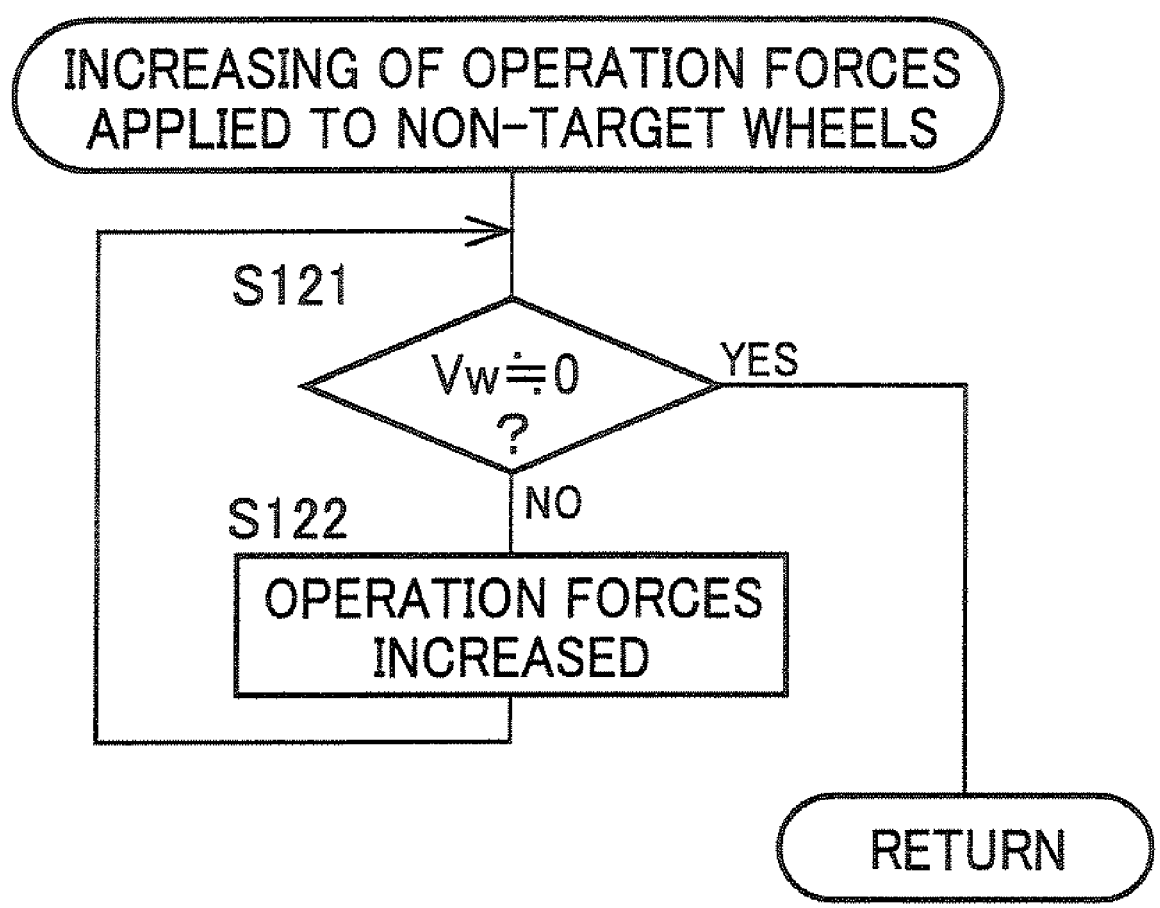
FIG. 13 is a flow chart representing another portion of the brake control program represented by the flow chart of FIG. 11, i.e., a brake-operation-force increasing control.

Step S57, i.e., the brake-operation-force increasing control with respect to the non-target wheels different from the operation-force-lowering target wheels is performed according to a flow chart shown in FIG. 13.

If the brake force of the vehicle as a whole is excessively lowered by zeroing the brake-operation forces applied to the operation-force-lowering target wheels, then the vehicle might be moved because of the excessively lowered brake force. In the present embodiment, this problem is avoided by increasing the brake-operation forces applied to the non-target wheels different from the operation-force-lowering target wheels.

First, at Step S121, the rotation speeds of the non-target wheels are detected by the corresponding wheel-speed sensors 80, and the brake ECU 152 judges whether the detected rotation speeds are substantially equal to zero, or are lower than a reference speed at which the vehicle can be regarded as being in its stopped state. If a positive judgment is made at Step S121, it is not needed to increase the brake-operation forces applied to the non-target wheels. On the other hand, if a negative judgment is made at Step S121, the control goes to Step S122 to increase the brake-operation forces applied to the non-target wheels. For example, in the case where the non-target wheels are the front wheels 4, the pressure-hold valves 56 are opened, the pressure-decrease valves 58 are closed, and the pump device 38 is operated and, in this state, the electric current supplied to the hydraulic-pressure control valve 50 is controlled to change the hydraulic pressures in the brake cylinders 46 to be higher than the hydraulic pressure in the master cylinder 36, such that the rotation speeds of the front wheels 4 are controlled to not higher than a reference speed.

In many cases, the body-height adjusting request is obtained in the state in which the vehicle is stopped. Therefore, in many cases, Steps S56 and S57 are carried out in the state in which the hydraulic brakes 14, 15 are in their operative states. Thus, at Step S57, the current brake-operation forces being applied to the non-target wheels are further increased. In addition, in many cases, if the brake-operation forces applied to the operation-force-lowering target wheels are lowered, then a negative judgment is made at Step S121.

Thus, since the brake-operation forces applied to the non-target wheels are increased, the brake force of the vehicle can be prevented from being excessively lowered during the body-height adjusting operation. In addition, since the brake-operation forces applied to the non-target wheels are increased such that the rotation speeds of the non-target wheels do not exceed the reference speed, the brake-operation forces can be prevented from being excessively increased and accordingly no amounts of energy are uselessly consumed in the braking operation.

In the present embodiment, the hydraulic pressures in the brake cylinders 46 (48) are increased, at Step S122, till the rotation speeds of the wheels 4 (10) are controlled to not higher than the reference speed. However, the brake ECU 152 may be modified to increase, at Step S122, the hydraulic pressures in the brake cylinders 46 (48) by a predetermined amount.

Alternatively, the brake ECU 152 may be modified such that the ECU 152 obtains, based on, e.g., the current condition of the vehicle (e.g., an angle of inclination of the road surface under the vehicle, the current position of the shift lever, and/or the drive-force transmission state of the vehicle), a moving force to move the vehicle, and increases the hydraulic pressures in the brake cylinders 46 (48) by an amount assuring that a brake force that can overcome the moving force is applied to the non-target wheels.

The brake ECU 152 is not essentially required to control the electric current supplied to the hydraulic-pressure control valve 50 (51). For example, it may arrange the hydraulic-pressure control actuator 24 (26) such that in a state in which a maximum electric current is being supplied to the hydraulic-pressure control valve 50 (51), the hydraulic liquid flows from the pump device 38 (40) to the brake cylinders 46 (48).

Also the brake ECU 152 may be modified such that when the brake-operation forces applied to the operation-force-lowering target wheels are lowered, the brake-operation forces applied to the non-target wheels are increased; and, when the brake-operation forces applied to the target wheels are restored from zero, the brake-operation forces applied to the non-target wheels are lowered.

Thus, the cooperative control is performed. When the cooperative control is being performed, a positive judgment is made at Step S52, and the control goes to Step S58 to judge whether the brake ECU 152 has received the body-height-adjusting-end information from the body-height adjusting ECU 150. If a negative judgment is made at Step S58, the control goes to Steps S56 and S57. On the other hand, if a positive judgment is made at Step S58, the control goes to Step S59 to reset the cooperative-control flag to its OFF state, and further to Step S54 to perform the normal brake control, because the body-height adjusting operation has ended and accordingly it is no longer needed to perform the cooperative control. Thus, the body-height-adjusting-end information also functions as a cooperative-control ending command. In the present embodiment, when the body-height adjusting operation ends, the cooperative control also ends.

On the other hand, if a hydraulic-brake operating request is not present, i.e., if a negative judgment is made at Step S51, the control of the brake ECU 152 goes to Step S60 to carry out an ending step in which the pump devices 38, 40 are placed in their inoperative states, and the hydraulic-pressure control valves 50, 51, the pressure-hold valves 56, 60, and the pressure-decrease valves 58, 62 are returned to their initial states shown in FIG. 3. In the case where a hydraulic-brake operating request that has been present extinguishes, the above-described ending step is carried out at Step S60; but in the case where no hydraulic-brake operating request has been present, a pre-braking operation is carried out at Step S60.

If the operation of the service-brake operating member 22 is stopped during the body-height adjusting operation, a negative judgment is made at Step S51 and accordingly the hydraulic brakes 14, 15 are placed in their inoperative states. In this case, the current brake control is ended irrespective of whether it may be the cooperative control or the normal brake control.

As is apparent from the foregoing description of the present embodiment, the body-height adjusting system 30, the body-height adjusting ECU 150, the body-height sensors 120, the body-height-adjusting-request obtaining device 170, etc. cooperate with each other to constitute a body-height adjusting device; and the body-height adjusting ECU 150, the brake ECU 152, the front-wheel hydraulic-pressure control actuator 24, the rear-wheel hydraulic-pressure control actuator 26, the wheel-speed sensors 80, the brake-operating-state detecting device 78, the hydraulic-brake-operation-state detecting device 72, etc. cooperate with each other to constitute a brake-operation-force control device. Portions of the brake ECU 152 that stores and implements Steps S55 through S57 of the brake control program represented by the flow chart of FIG. 11, and portions of the body-height adjusting ECU 150 that stores and implements Steps S4 through S6 of the body-height adjusting program represented by the flow chart of FIG. 5 cooperate with each other to constitute an operation-force lowering portion of the brake-operation-force control device.

In addition, portions of the body-height adjusting ECU 150 that store and implement Step S35 of the flow chart of FIG. 7 and portions of the brake ECU 152 that store and implement Step S56 of the flow chart of FIG. 11, cooperate with each other to constitute a larger-displacement-side operation-force lowering portion; and portions of the body-height adjusting ECU 150 that store and implement Steps S37 through S39 and portions of the brake ECU 152 that store and implement Step S56 cooperate with each other to constitute a first and a second force-direction-dependent operation-force lowering portion. Moreover, portions of the brake ECU 152 that store and implement Step S56 constitute a body-height-change-amount-dependent operation-force lowering portion and an intermittently lowering portion; portions of the brake ECU 152 that store and implement Steps S56 and S57 constitute an operation-force lowering and increasing portion and an operation force increasing portion; portions of the brake ECU 152 that store and implement Step S56 constitute a service-brake control portion; and portions of the brake ECU 152 that store and implement Step S56 and portions of the body-height adjusting ECU 150 that store and implement Step S34 cooperate with each other to constitute a parking-brake-free-side operation-force lowering portion.

In the illustrated embodiment, when the vehicle is in the front-wheel drive-force transmission state, and if the direction of the drive force $F_D$ transmitted to the front wheels 4 and the direction of the front-rear force $F_S$ applied to the same 4 are same as each other, then the front wheels 4 are selected as the operation-force-lowering target wheels; and if the two directions are opposite to each other, the rear wheels 10 are selected as the operation-force-lowering target wheels. However, when the vehicle is in the front-wheel drive-force transmission state, the body-height adjusting ECU 150 may select the rear wheels 10 as the operation-force-lowering target wheels, without judging whether the two directions are same as each other or not, as shown in a flow chart of FIG. 15.

If it is judged at Step S36 that the vehicle is in the front-wheel drive-force transmission state, then the control of the ECU 150 goes to Step S37' to select, as the operation-force-lowering target wheels, the rear wheels 10 that are the non-drive wheels. Since the non-drive wheels are selected as the operation-force-lowering target wheels, it is possible to prevent such a problem that because the direction of the drive force $F_D$ and the direction of the front-rear force $F_S$ are opposite to each other, the wheels may not become more easily movable even if the brake-operation forces applied thereto may be zeroed.

Figure 15:
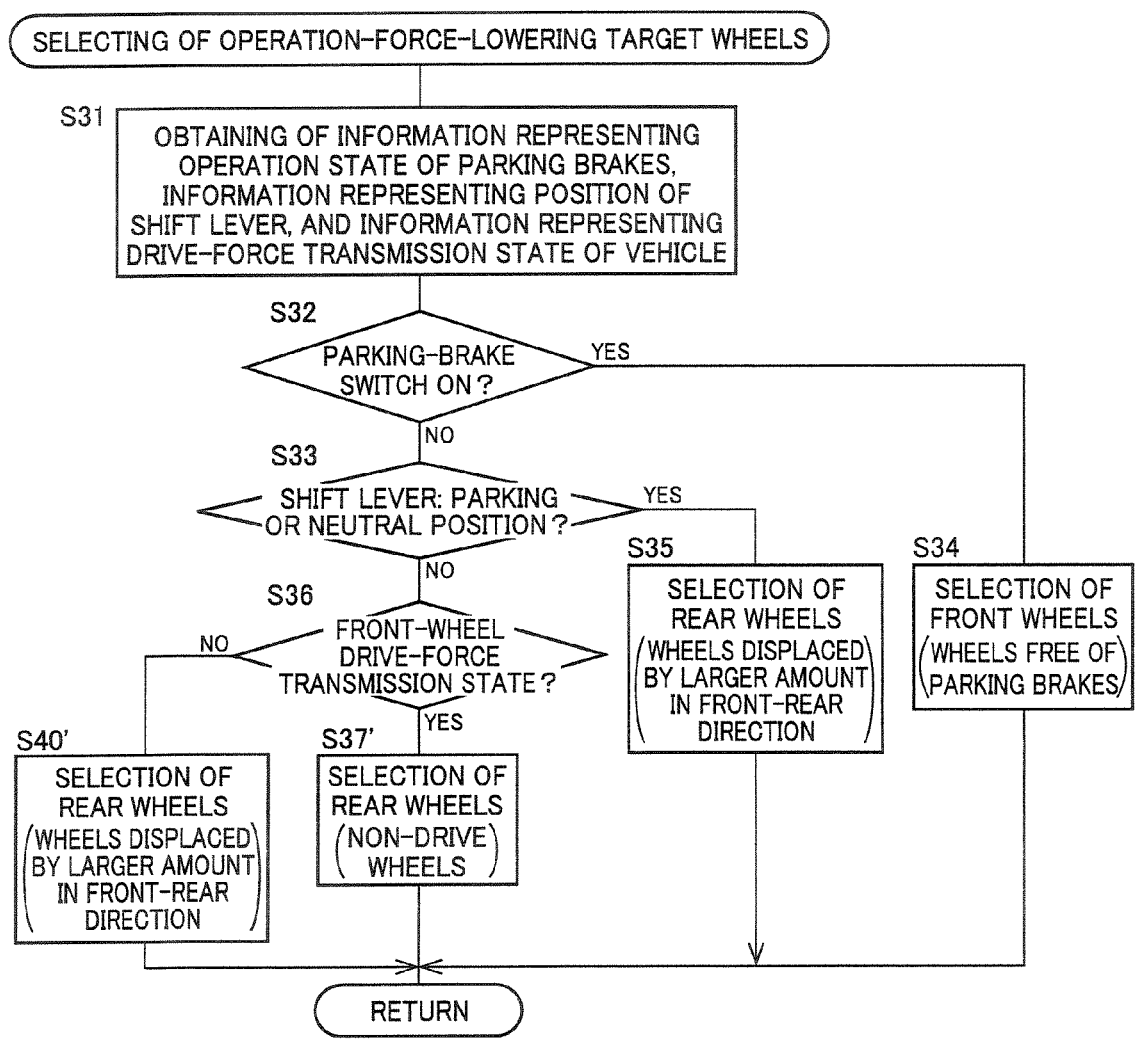
FIG. 15 is a flow chart representing a portion of another body-height adjusting program that may be stored, in place of the body-height adjusting program of FIG. 5, by the body-height adjusting ECU, i.e., a routine of selecting operation-force-lowering target wheels.

In addition, in the case where the vehicle is in the four-wheel drive-force transmission state, the ECU 150 may constantly select, as the operation-force-lowering target wheels, the rear wheels 10 that are displaced, when the body heights are adjusted, by a grater amount in the front-rear direction than the front wheels 4, at Step S40' of FIG. 15.

Thus, in the present embodiment, the ECU 150 need not judge whether the direction of the drive force $F_D$ and the direction of the front-rear force $F_S$ are same as each other. In the present embodiment, portions of the body-height adjusting ECU 150 that store and implement Step S37' of FIG. 15 and portions of the brake ECU 152 that store and implement Step S56 of FIG. 11 cooperate with each other to constitute a non-drive-wheel operation-force lowering portion.

In the illustrated embodiment, each time the virtual wheel base change amount $\Delta L$ exceeds the reference amount A during the body-height adjusting operation, the hydraulic brakes 14 or 15 corresponding to the operation-force-lowering target wheels are placed in their inoperative states. However, the illustrated embodiment may be modified such that when the virtual wheel base change amount $\Delta L$ exceeds the reference amount A during the body-height adjusting operation, the hydraulic brakes 14 or 15 corresponding to the operation-force-lowering target wheels are placed in their inoperative states, only one time.

Figure 16:
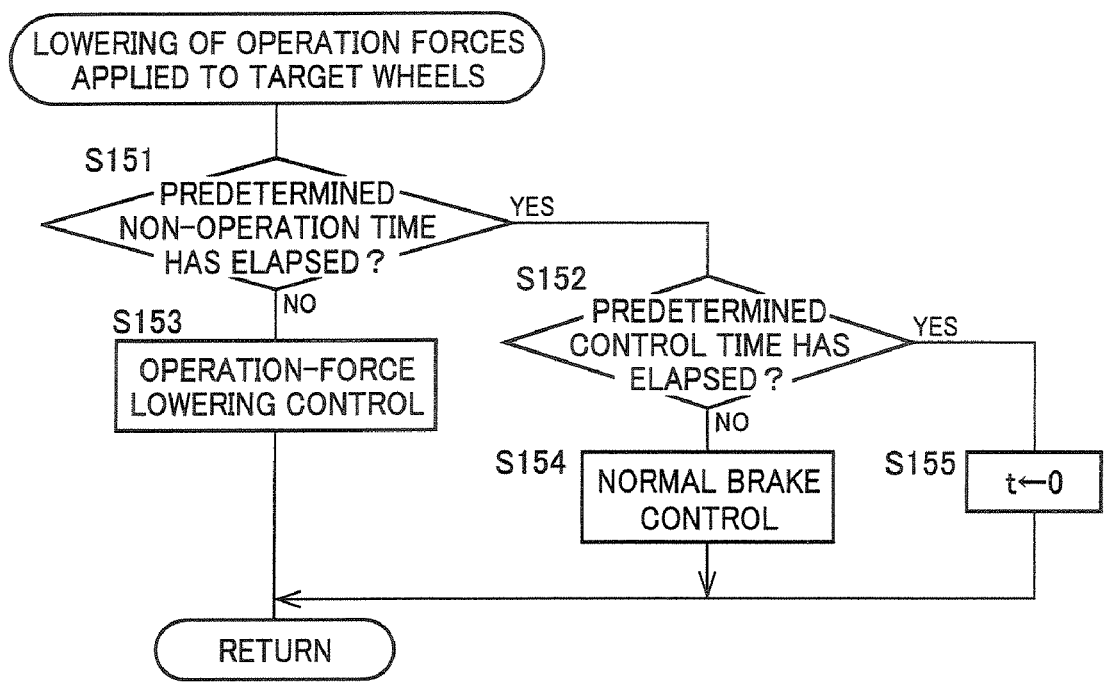
FIG. 16 is a flow chart representing a portion of another brake control program that may be stored, in place of the brake control program of FIG. 11, by the brake ECU, i.e., a brake-operation-force lowering control.

Alternatively, the illustrated embodiment may be modified such that each time a predetermined time duration elapses during each body-height adjusting operation, the hydraulic brakes 14 or 15 corresponding to the operation-force-lowering target wheels are placed in their inoperative states, as shown in a flow chart of FIG. 16. In the present modified embodiment, during a predetermined non-operation time duration, the pressure-hold valves 56 or 60 are kept closed and the pressure-decrease valves 58 or 62 are kept opened (i.e., the hydraulic brakes 14 or 15 are placed in their inoperative states), and subsequently during a predetermined operation time duration, the normal brake control is performed (i.e., the hydraulic brakes 14 or 15 are placed in their operative states).

Figure 17:
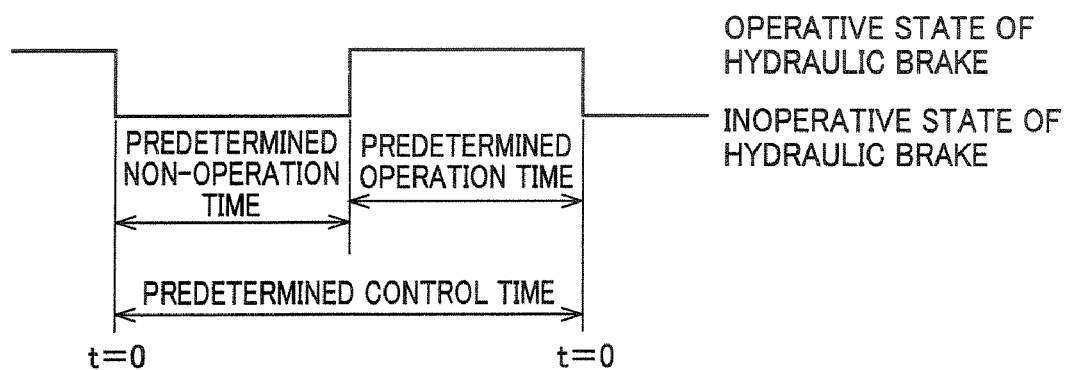
FIG. 17 is an illustrative view for explaining two operation states of each hydraulic brake under the brake-operation-force lowering control of FIG. 16.

More specifically described, first, at Step S151, the brake ECU 152 judges whether the predetermined non-operation time duration, illustrated in FIG. 17, has elapsed since the ECU 152 received the cooperative-control command. If a positive judgment is made at Step S151, the control goes to Step S152 to judge whether the predetermined operation time duration following the predetermined non-operation time duration has elapsed over a predetermined control time duration that is equal to a sum of the two time durations, as illustrated in FIG. 17.

On the other hand, if a negative judgment is made at Step S151, the control goes to Step S153 to place the hydraulic brakes 14 or 15 in their inoperative states. In addition, if a negative judgment is made at Step S152, the control goes to Step S154 to perform the normal brake control. Moreover, if a positive judgment is made at Step S152, the control goes to Step S155 to reset a counter that measures time, to zero (t=0). When Step S151 is carried out for the next time, a negative judgment is made, so that the control goes to Step S153 to place the hydraulic brakes 14 or 15 in their inoperative states. Thereafter, the operation-force lowering control at Step S153 and the normal brake control at Step S154 are alternately repeated at a predetermined time period. That is, the hydraulic brakes 14 or 15 are periodically placed in their inoperative states and in their operative states.

In the above-described modified embodiment, after each body-height adjusting operation is started, first the operation-force lowering control is performed at Step S153 and then the normal brake control is performed at Step S154. However, the modified embodiment may be further modified such that first the normal brake control is performed and then the operation-force lowering control is performed.

In each of the above-illustrated embodiment and its modified embodiments, the adjusting of the body heights corresponding to the front wheels 4 and the adjusting of the body heights corresponding to the rear wheels 10 may be performed independent of each other, e.g., with a time interval interposed therebetween. In this case, when the adjusting of the body heights corresponding to the front wheels 4 is performed, the body-height adjusting ECU 150 may select, at Step S6 of FIG. 5, the front wheels 4 as the operation-force-lowering target wheels, so that the brake ECU 152 may lower, at Step S56, the hydraulic pressures in the hydraulic cylinders 46 corresponding to the front wheels 4, to the atmospheric pressure; and when the adjusting of the body heights corresponding to the rear wheels 10 is performed, the body-height adjusting ECU 150 may select, at Step S6, the rear wheels 10 as the operation-force-lowering target wheels, so that the brake ECU 152 may lower, at Step S56, the hydraulic pressures in the hydraulic cylinders 48 corresponding to the rear wheels 10, to the atmospheric pressure.

In each of the above-illustrated embodiment and its modified embodiments, the body-height adjusting ECU 150 may be modified to select, as the operation-force-lowering target wheels, a pre-selected pair of wheels of the pair of front wheels 4 and the pair of rear wheels 10. The pre-selected pair of wheels may be either the pair of front wheels 4 or the pair of rear wheels 10. For example, as described in the embodiment, a pair of wheels to which the larger wheel-base change amount ΔL occurs during the body-height adjusting operation may be pre-selected. However, a pair of wheels to which the smaller wheel-base change amount ΔL occurs may be pre-selected. Moreover, the body-height adjusting ECU 150 may be modified to select, as the operation-force-lowering target wheels, the pair of front wheels 4 or the pair of rear wheels 10, depending on the total number of times by which the body-height-adjusting-cooperative brake control (i.e., the cooperative control) has been performed. For example, the ECU 150 may alternately select, as the operation-force-lowering target wheels, the pair of front wheels 4 or the pair of rear wheels 10, each time the cooperative control has been performed a predetermined number of time(s). The predetermined number may be one, or two or more.

The mechanical parking brakes 16 used in the illustrated embodiment may be replaced with electric parking brakes. In the latter case, respective brake-operation forces of the electric parking brakes may be automatically controlled to zero. Thus, a degree of freedom of selection of the operation-force-lowering target wheels is increased.

The illustrated embodiment relates to the part-time four-wheel-drive vehicle that can be switched between the front-wheel drive-force transmission state and the four-wheel drive-force transmission state. However, the present invention is applicable to a front-wheel-drive vehicle, a rear-wheel-drive vehicle, and a full-time four-wheel-drive vehicle.

The illustrated embodiment relates to the vehicle control system employing the plurality of computers 150, 152, 154, 156 that implement the respective control programs. However, those computers 150, 152, 154, 156 may be replaced with a single computer that implements a control program so as to output necessary operation commands.

Each of the suspension corresponding to the front wheels 4 and the suspension corresponding to the rear wheels 10 may be provided by any sort of known suspension.

While the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

The invention claimed is:

1. A vehicle control system for controlling a vehicle having a body, a pair of front wheels, and a pair of rear wheels, comprising:
a body-height adjusting device which adjusts four body heights each of which is defined as a relative-position relationship between corresponding one wheel of the pair of front wheels and the pair of rear wheels, and the body; and
a brake-operation-force control device which controls respective operation forces of a pair of front-wheel brakes and a pair of rear-wheel brakes that restrain respective rotations of the pair of front wheels and the pair of rear wheels,
wherein the brake-operation-force control device comprises an operation-force lowering portion which controls, in at least a portion of a time duration when the body-height adjusting device adjusts at least one of the four body heights, the respective operation forces of at least one pair of brakes of the pair of front-wheel brakes and the pair of rear-wheel brakes, so that the controlled operation forces are low as compared with said respective operation forces when the body-height adjusting device does not adjust any of the four body heights, and
wherein the operation-force lowering portion comprises a body-height-change-amount-dependent operation-force lowering portion which lowers, when an amount of change of said at least one body height caused by the body-height adjusting device has reached a first reference amount, the respective operation forces of said at least one pair of brakes of the pair of front-wheel brakes and the pair of rear-wheel brakes.

2. The vehicle control system according to claim 1, wherein the operation-force lowering portion comprises a wheel-rotation permitting portion which controls, in at least said portion of the time duration when the body-height adjusting device adjusts said at least one body height, the respective operation forces of said at least one pair of brakes, so as to permit respective rotations of at least corresponding one pair of wheels of the pair of front wheels and the pair of rear wheels, and thereby permit a change of a wheel base defined as a distance between the pair of front wheels and the pair of rear wheels.

3. The vehicle control system according to claim 1, wherein the operation-force lowering portion comprises a body-height-adjusting-side operation-force controlling portion which controls, in at least said portion of the time duration when the body-height adjusting device adjusts said at least one body height, the respective operation forces of said at least one pair of brakes that correspond to said at least one body height.

4. The vehicle control system according to claim 1, wherein the operation-force lowering portion comprises a larger-displacement-side operation-force lowering portion which lowers the respective operation forces of one pair of brakes of the pair of front-wheel brakes and the pair of rear-wheel brakes that correspond to a larger one of respective relative displacements between each pair of wheels of the pair of front wheels and the pair of rear wheels, and the body, that are so designed as to, when the body-height adjusting device changes the four body heights by a same amount, occur in a front-rear direction of the vehicle because of the changing of the four body heights.

5. The vehicle control system according to claim 1, wherein the pair of front wheels and the pair of rear wheels comprise a pair of drive wheels to which a drive force of a drive source of the vehicle is transmitted, and a pair of non-drive wheels to which said drive force is not transmitted, and wherein the operation-force lowering portion comprises a non-drive-wheel operation-force lowering portion which lowers, at least in a state in which said drive force is transmitted to the pair of drive wheels, the respective operation forces of one pair of brakes of the pair of front-wheel brakes and the pair of rear-wheel brakes that correspond to the pair of non-drive wheels.

6. The vehicle control system according to claim 1, wherein the pair of front wheels and the pair of rear wheels comprise two pairs of drive wheels to each of which a drive force of a drive source of the vehicle is transmitted, and wherein the operation-force lowering portion comprises a four-drive-wheel force-direction-dependent operation-force lowering portion which lowers the respective operation forces of one pair of brakes of the pair of front-wheel brakes and the pair of rear-wheel brakes that correspond to one pair of drive wheels of the two pairs of drive wheels, when a direction of the drive force transmitted to said one pair of drive wheels is same as a direction of a force applied to said one pair of drive wheels because of the adjusting of said at least one body height by the body-height adjusting device.

7. The vehicle control system according to claim 1, wherein the operation-force lowering portion comprises a memory which stores, for each pair of wheels of the pair of front wheels and the pair of rear wheels, a relationship between (a) said at least one body height that is adjusted by the body-height adjusting device and (b) relative position between the body and said each pair of wheels in a front-rear direction of the vehicle that is changed when said at least one body height is adjusted by the body-height adjusting device.

8. The vehicle control system according to claim 1, wherein the operation-force lowering portion comprises a reference-value-dependent operation-force lowering portion which lowers the respective operation forces of said at least one pair of brakes to a value not greater than a reference value.

9. The vehicle control system according to claim 1, wherein the operation-force lowering portion comprises an intermittently lowering portion which intermittently increases the respective operation forces of said at least one pair of brakes to a value not smaller than a first reference value and lowers said respective operation forces to a value not greater than a second reference value smaller than the first reference value.

10. The vehicle control system according to claim 1, wherein the operation-force lowering portion comprises a periodically lowering portion which selectively switches, at a predetermined time period, said at least one pair of brakes to a first operation state thereof in which the respective operation forces thereof are not smaller than a first reference value, and to a second operation state thereof in which the respective operation forces thereof are not greater than a second reference value smaller than the first reference value.

11. The vehicle control system according to claim 1, wherein the operation-force lowering portion comprises a first operation-force-dependent operation-force lowering portion which controls, when the amount of change of said at least one body height caused by the body-height adjusting device has reached the first reference amount in a state in which the respective operation forces of the pair of front-wheel brakes and the pair of rear-wheel brakes are not smaller than a first reference value, the respective operation forces of said at least one pair of brakes to a value not greater than a second reference value smaller than the first reference value, for a predetermined time duration.

12. The vehicle control system according to claim 1, wherein the operation-force lowering portion comprises an operation-force lowering and increasing portion which lowers the respective operation forces of one pair of brakes of the pair of front-wheel brakes and the pair of rear-wheel brakes and increases the respective operation forces of an other pair of brakes of the pair of front-wheel brakes and the pair of rear-wheel brakes.

13. The vehicle control system according to claim 12, wherein the operation-force lowering and increasing portion controls the respective operation forces of said other pair of brakes to a value assuring that a speed of movement of the vehicle is not higher than a reference speed.

14. The vehicle control system according to claim 1, wherein the operation-force lowering portion comprises a brake control portion which lowers the respective operation forces of said at least one pair of brakes when the pair of front-wheel brakes and the pair of rear-wheel brakes are in respective operative states thereof and a body-height adjusting request is obtained.

15. The vehicle control system according to claim 1, wherein the operation-force lowering portion comprises a stopped-state-dependent operation-force controlling portion which controls the respective operation forces of said at least one pair of brakes when a speed of movement of the vehicle is not higher than a reference speed at which the vehicle can be regarded as being in a stopped state, and in at least said portion of the time duration when the body-height adjusting device adjusts said at least one body height.

16. The vehicle control system according to claim 1, wherein the operation-force lowering portion comprises a target-stroke-dependent operation-force lowering portion which lowers the respective operation forces of said at least one pair of brakes when an absolute value of a difference of (a) a value of said at least one body height when the body-height adjusting device starts adjusting said at least one body height, and (b) a target value of said at least one body height, is not smaller than a reference value.

17. The vehicle control system according to claim 1, wherein the operation-force lowering portion comprises a second operation-force-dependent operation-force controlling portion which controls the respective operation forces of said at least one pair of brakes when an average value of the respective operation forces of said at least one pair of brakes is not smaller than a reference value, and in at least said portion of the time duration when the body-height adjusting device adjusts said at least one body height.

18. The vehicle control system according to claim 1, wherein the pair of front-wheel brakes and the pair of rear-wheel brakes comprise two pairs of service brakes which correspond to the pair of front wheels and the pair of rear wheels, respectively, and the vehicle has at least one pair of parking brakes corresponding to at least one pair of service brakes of the two pairs of service brakes, wherein the brake-operation-force control device controls each of respective operation forces of the two pairs of service brakes and respective operation forces of said at least one pair of parking brakes, and wherein the operation-force lowering portion lowers at least one of (a) the respective operation forces of at least one pair of service brakes of the two pairs of service brakes and (b) the respective operation forces of said at least one pair of parking brakes.

19. The vehicle control system according to claim 1, wherein the vehicle has, in addition to the pair of front-wheel brakes and the pair of rear-wheel brakes as two pairs of first brakes whose operation forces are controllable by the brake-operation-force control device and which are provided for the pair of front wheels and the pair of rear wheels, respectively, a pair of second brakes whose operation forces are not controllable by the brake-operation-force control device and which are provided for one pair of wheels of the pair of front wheels and the pair of rear wheels, and wherein the operation-force lowering portion comprises an uncontrollable-brake-free-side operation-force lowering portion which lowers, when the two pairs of first brakes are in respective operative states thereof and the pair of second brakes are in respective operative states thereof, the respective operation forces of one pair of first brakes of the two pairs of first brakes that correspond to an other pair of wheels of the pair of front wheels and the pair of rear wheels for which the pair of second brakes are not provided.

20. The vehicle control system according to claim 1, wherein the operation-force lowering portion comprises:
a body-height-change-amount obtaining portion which obtains the amount of change of said at least one body height caused by the body-height adjusting device;
a memory which stores, for each pair of wheels of the pair of front wheels and the pair of rear wheels, a relationship between (a) said at least one body height that is adjusted by the body-height adjusting device and (b) wheel base of the vehicle that is defined as a distance between the pair of front wheels and the pair of rear wheels and is changed when said at least one body height is adjusted by the body-height adjusting device; and
a wheel-base-change-amount-dependent operation-force controlling portion which obtains, based on the amount of change of said at least one body height obtained by the body-height-change-amount obtaining portion and the relationship between (a) said at least one body height and (b) said wheel base stored by the memory, an amount of change of the wheel base of the vehicle, and controls, in at least said portion of the time duration when the body-height adjusting device adjusts said at least one body height and when the obtained amount of change of the wheel base has reached a second reference amount on an assumption that at least one of the front and rear wheels that corresponds said at least one body height is permitted to rotate, the respective operation forces of said at least one pair of brakes.

21. A vehicle control system for controlling a vehicle having a body, a pair of front wheels, and a pair of rear wheels, comprising:
a body-height adjusting device which adjusts four body heights each of which is defined as a relative-position relationship between corresponding one wheel of the pair of front wheels and the pair of rear wheels, and the body; and
a brake-operation-force control device which controls respective operation forces of a pair of front-wheel brakes and a pair of rear-wheel brakes that restrain respective rotations of the pair of front wheels and the pair of rear wheels,
wherein the brake-operation-force control device comprises an operation-force lowering portion which controls, in at least a portion of a time duration when the body-height adjusting device adjusts at least one of the four body heights, the respective operation forces of at least one pair of brakes of the pair of front-wheel brakes and the pair of rear-wheel brakes, so that the controlled operation forces are low as compared with said respective operation forces when the body-height adjusting device does not adjust any of the four body heights, and
wherein the operation-force lowering portion comprises a wheel-base-change-amount-dependent operation-force controlling portion which controls, in at least said portion of the time duration when the body-height adjusting device adjusts said at least one body height and when an amount of change of a wheel base of the vehicle caused by the adjusting of said at least one body height has reached a second reference amount on an assumption that at least one of the front and rear wheels that corresponds said at least one body height is permitted to rotate, the respective operation forces of said at least one pair of brakes.

22. A vehicle control system for controlling a vehicle having a body, a pair of front wheels, and a pair of rear wheels, comprising:
a body-height adjusting device which adjusts four body heights each of which is defined as a relative-position relationship between corresponding one wheel of the pair of front wheels and the pair of rear wheels, and the body; and
a brake-operation-force control device which controls respective operation forces of a pair of front-wheel brakes and a pair of rear-wheel brakes that restrain respective rotations of the pair of front wheels and the pair of rear wheels,
wherein the brake-operation-force control device comprises an operation-force lowering portion which controls, in at least a portion of a time duration when the body-height adjusting device adjusts at least one of the four body heights, the respective operation forces of at least one pair of brakes of the pair of front-wheel brakes and the pair of rear-wheel brakes, so that the controlled operation forces are low as compared with said respective operation forces when the body-height adjusting device does not adjust any of the four body heights, and
wherein the pair of front-wheel brakes and the pair of rear-wheel brakes comprise two pairs of service brakes which correspond to the pair of front wheels and the pair of rear wheels, respectively, and which are operated by operating a service-brake operating member of the vehicle, and wherein the operation-force lowering portion comprises a service-brake control portion which controls, in at least said portion of the time duration when the body-height adjusting device adjusts said at least one body height in a state in which the service-brake operating member is operated, respective operation forces of one pair of service brakes of the two pairs of service brakes that are applied to corresponding one pair of wheels of the pair of front wheels and the pair of rear wheels.

23. The vehicle control system according to claim 22, wherein the service-brake control portion comprises a parking-brake-free-side operation-force lowering portion which lowers the respective operation forces of said one pair of service brakes that correspond to said one pair of wheels that are free of a parking brake.

24. The vehicle control system according to claim 22, wherein the service-brake control portion comprises a parking-brake-inoperative-state-dependent operation-force lowering portion which lowers, when a pair of parking brakes of the vehicle are in respective operative states thereof for one pair of wheels of the pair of front wheels and the pair of rear wheels, the respective operation forces of said one pair of service brakes that correspond to an other pair of wheels of the pair of front wheels and the pair of rear wheels.

25. A vehicle control system for controlling a vehicle having a body, a pair of front wheels, and a pair of rear wheels, comprising:
a body-height adjusting device which adjusts four body heights each of which is defined as a relative-position relationship between corresponding one wheel of the pair of front wheels and the pair of rear wheels, and the body; and a brake-operation-force control device which controls respective operation forces of a pair of front-wheel brakes and a pair of rear-wheel brakes that restrain respective rotations of the pair of front wheels and the pair of rear wheels, wherein the brake-operation-force control device comprises an operation-force lowering portion which controls, in at least a portion of a time duration when the body-height adjusting device adjusts at least one of the four body heights, the respective operation forces of at least one pair of brakes of the pair of front-wheel brakes and the pair of rear-wheel brakes, so that the controlled operation forces are low as compared with said respective operation forces when the body-height adjusting device does not adjust any of the four body heights, wherein the pair of front wheels and the pair of rear wheels comprise a pair of drive wheels to which a drive force of a drive source of the vehicle is transmitted, and a pair of non-drive wheels to which said drive force is not transmitted, and wherein the operation-force lowering portion comprises at least one of (A) a first force-direction-dependent operation-force lowering portion which lowers, when a direction of the drive force transmitted to the pair of drive wheels is same as a direction of a force applied to the pair of drive wheels because of the adjusting of said at least one body height by the body-height adjusting device, the respective operation forces of one pair of brakes of the pair of front-wheel brakes and the pair of rear-wheel brakes that correspond to the pair of drive wheels, and (B) a second force-direction-dependent operation-force lowering portion which lowers, when a direction of the drive force transmitted to the pair of drive wheels is opposite to a direction of a force applied to the pair of drive wheels because of the adjusting of said at least one body height by the body-height adjusting device, the respective operation forces of one pair of brakes of the pair of front-wheel brakes and the pair of rear-wheel brakes that correspond to the pair of non-drive wheels.

26. The vehicle control system according to claim 25, wherein the operation-force lowering portion comprises the first force-direction-dependent operation-force lowering portion.

27. The vehicle control system according to claim 26, wherein the first force-direction-dependent operation-force lowering portion comprises a direction obtaining portion which obtains respective directions of respective forces applied to the pair of front wheels and the pair of rear wheels because of the adjusting of said at least one body height by the body-height adjusting device.

28. The vehicle control system according to claim 26, wherein the first force-direction-dependent operation-force lowering portion comprises a two-wheel drive-force transmission-state obtaining portion which detects whether the vehicle is in a two-wheel drive-force transmission state in which the drive force of the drive source is transmitted to one pair of wheels of the pair of front wheels and the pair of rear wheels and is not transmitted to an other pair of wheels of the pair of front wheels and the pair of rear wheels.

29. The vehicle control system according to claim 26, wherein the first force-direction-dependent operation-force lowering portion comprises a drive-wheel drive-force transmission-state obtaining portion which detects whether the drive force of the drive source is transmitted to the pair of drive wheels.

30. The vehicle control system according to claim 25, wherein the operation-force lowering portion comprises the second force-direction-dependent operation-force lowering portion.

* * * * *